US011544040B2

(12) United States Patent
Hanyu et al.

(10) Patent No.: US 11,544,040 B2
(45) Date of Patent: Jan. 3, 2023

(54) RANDOM NUMBER GENERATOR

(71) Applicants: TOHOKU UNIVERSITY, Sendai (JP); CANON MEDICAL SYSTEMS CORPORATION, Otawara (JP)

(72) Inventors: Takahiro Hanyu, Sendai (JP); Naoya Onizawa, Sendai (JP); Akira Tamakoshi, Sendai (JP); Hiroyuki Fujita, Toshima (JP); Hitoshi Yamagata, Otawara (JP)

(73) Assignees: TOHOKU UNIVERSITY, Sendai (JP); CANON MEDICAL SYSTEMS CORPORATION, Otawara (JP)

( * ) Notice: Subject to any disclaimer, the term of this patent is extended or adjusted under 35 U.S.C. 154(b) by 99 days.

(21) Appl. No.: 17/018,644

(22) Filed: Sep. 11, 2020

(65) Prior Publication Data
US 2021/0117159 A1 Apr. 22, 2021

(30) Foreign Application Priority Data

Oct. 18, 2019 (JP) .............................. JP2019-190987
Sep. 10, 2020 (JP) .............................. JP2020-152266

(51) Int. Cl.
*G06F 7/58* (2006.01)
(52) U.S. Cl.
CPC .................................. *G06F 7/588* (2013.01)
(58) Field of Classification Search
CPC ........................................................ G06F 7/588
USPC .......................................................... 708/255
See application file for complete search history.

(56) References Cited

U.S. PATENT DOCUMENTS

2011/0123022 A1* 5/2011 Oishi ...................... G06F 7/588
380/46
2019/0347074 A1* 11/2019 Choi ...................... G06F 7/588

OTHER PUBLICATIONS

Y. Shim, et al., Biased Random Walk Using Stochastic Switching of Nanomagnets: Application to SAT Solver, IEEE Transactions on Electron Devices, vol. 65, No. 4, 2018 (Year: 2018).*
H.Lee et al., Design of high-throughput and low-power true random number generator utilizing perpendicularly magnetized voltage-controlled magnetic tunnel junction, AIP Advances 7, 055934, 2017 (Year: 2017).*
S. Oosawa et al., Design of an STT-MTJ Based True Random Number Generator Using Digitally Controlled Probability-Locked Loop, 2015 IEEE 13th International New Circuits and Systems Conference (Newcas), IEEE 2015 (Year: 2015).*

(Continued)

*Primary Examiner* — Emily E Larocque
(74) *Attorney, Agent, or Firm* — Oblon, McClelland, Maier & Neustadt, L.L.P.

(57) ABSTRACT

A random number generator according to one embodiment includes a write circuit, a read circuit, and a signal output circuit. The write circuit inverts magnetization of a magnetic layer of a magnetic tunnel junction element stochastically by supplying current to the magnetic layer. The read circuit reads the magnetization. The signal output circuit generates a random number on the basis of the magnetization read by the read circuit. The random number generator includes a sequence control circuit that controls the write circuit and the read circuit. The sequence control circuit regulates the write circuit to supply the current to the write circuit in a first period, and causes the read circuit to read the magnetization after the first period is finished and then a second period longer than the first period is elapsed.

12 Claims, 19 Drawing Sheets

(56) References Cited

OTHER PUBLICATIONS

W.H. Choi et al., A Magnetic Tunnel Junction Based True Random Number Generator with Conditional Perturb and Real-Time Output Probability Tracking, 2014 IEEE International Electron Devices Meeting, IEEE 2014 (Year: 2014).*
S. Bhuin et al., Strained MTJs with Latch-based Sensing for Stochastic Computing, Proceedings of the 17th IEEE International Conference on Nanotechnology, IEEE 2017 (Year: 2017).*
W. Kang et al., High reliability sensing circuit for deep submicron spin transfer torque magnetic random access memory, Electronic Letters, vol. 49, No. 20, 2013 (Year: 2013).*
S. Motaman et al., Novel Application of Spintronics in Computing, Sensing, Storage and Cybersecurity, EDAA, 2018 (Year: 2018).*
A. Tamakoshi et al., Design of an Energy-Efficient True Random Number Generator Based on Triple Read-Write Data-Steam Multiplexing of MTJ Devices, IEEE, 2020 (Year: 2020).*
N. Onizawa, et al. High-Throughput/Low-Energy MTJ-Based Tue Random Number Generator Using a Multi-Voltage/Current Converter, IEEE Transactions on Very Large Scale Integration (VLSI) Systems, vol. 28, No. 10, 2020 (Year: 2020).*
Shogo Mukaida, et al., "Design of a Low-Power MTJ-Based True Random Number Generator Using a Multi-Voltage/Current Converter," 2018 IEEE 48th International Symposium on Multiple-Valued Logic (ISMVL), May 2018, pp. 156-161.

* cited by examiner

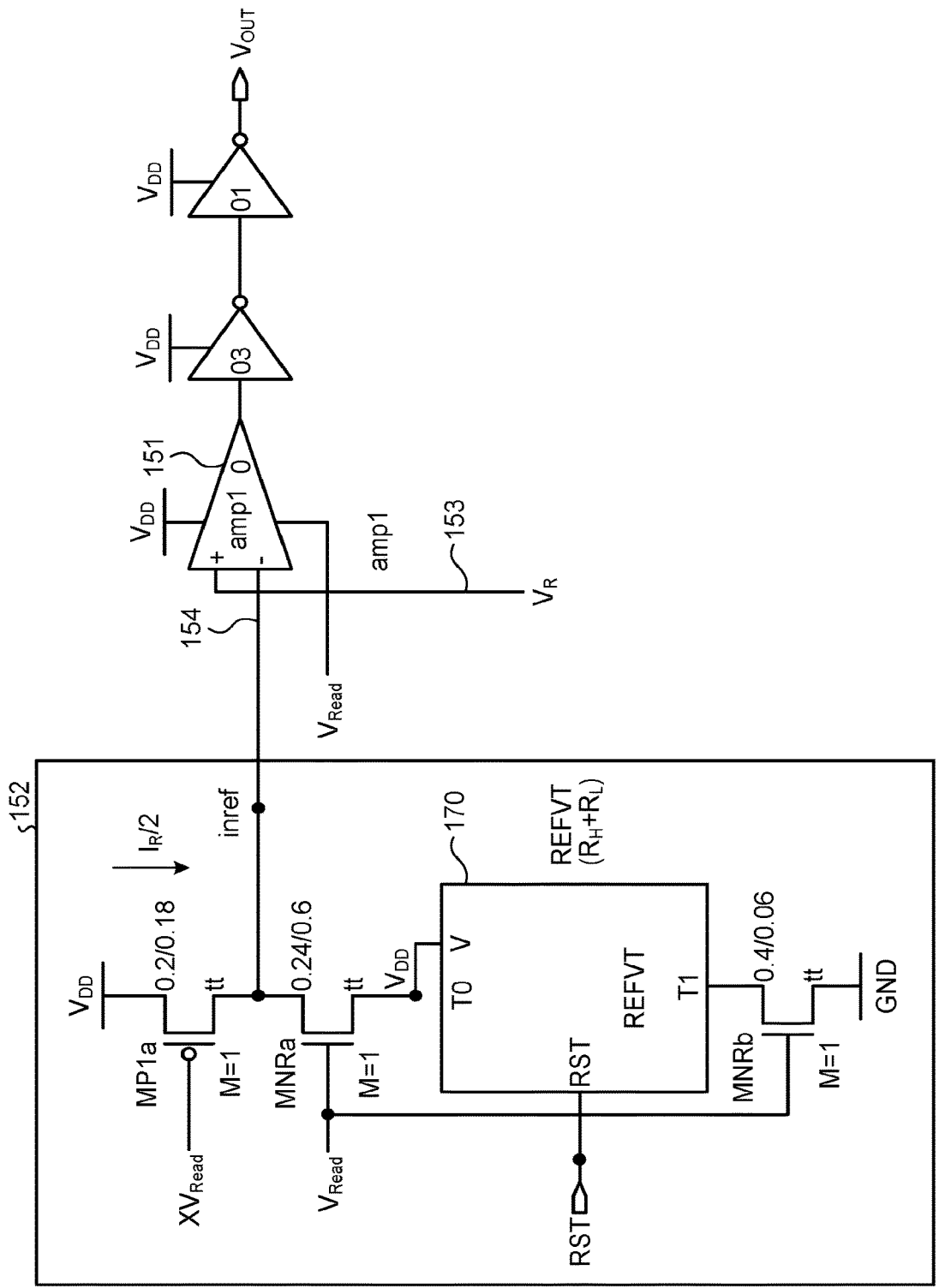

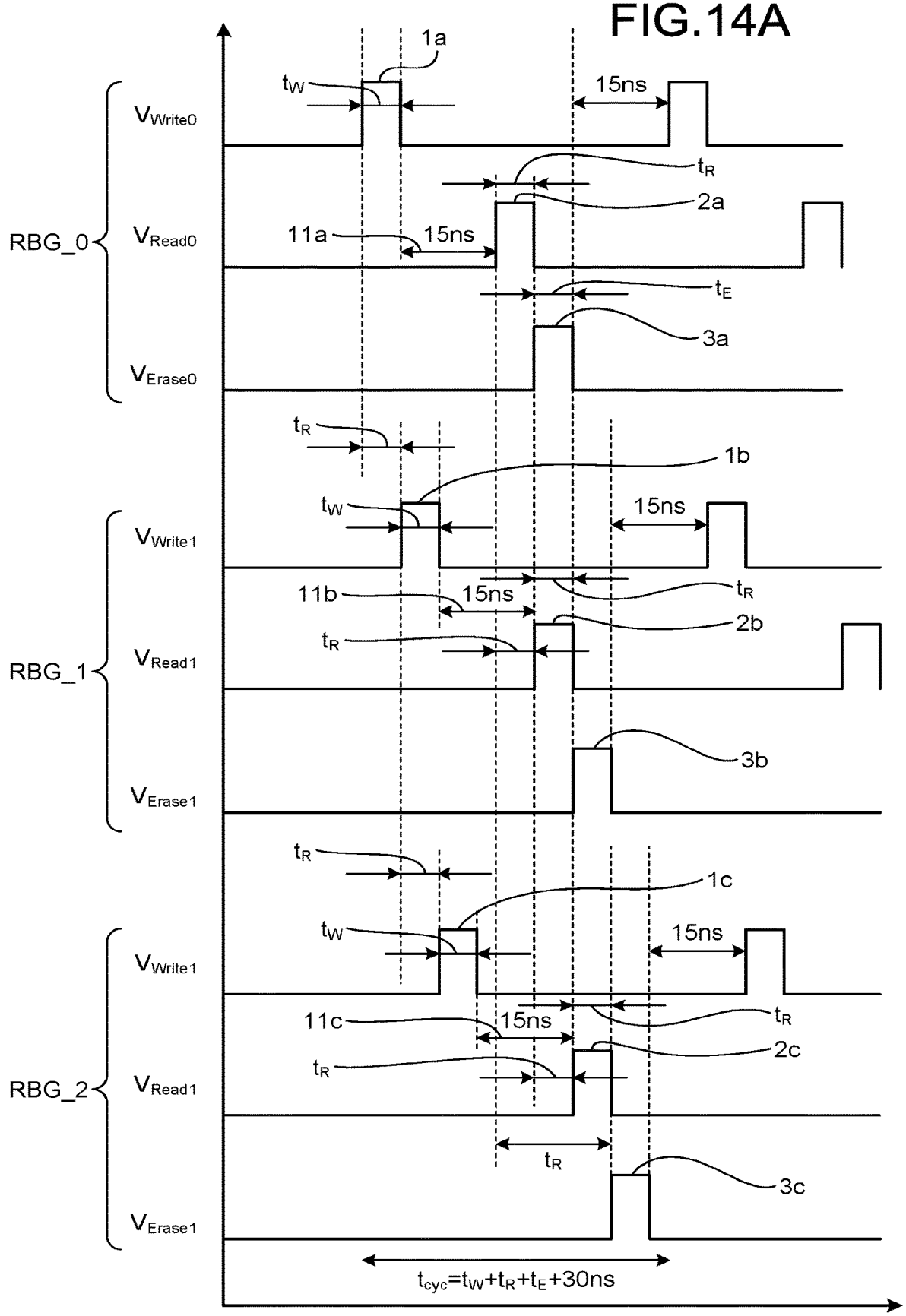

RANDOM NUMBER GENERATOR

CROSS-REFERENCE TO RELATED APPLICATIONS

This application is based upon and claims the benefit of priority from Japanese Patent Application No. 2019-190987, filed on Oct. 18, 2019 and Japanese Patent Application No. 2020-152266, filed on Sep. 10, 2020; the entire contents of which are incorporated herein by reference.

FIELD

Embodiments described herein relate generally to a random number generator.

BACKGROUND

Some methods for generating random numbers use mathematical algorithms.

The random numbers generated by the mathematical algorithms, however, are pseudo-random numbers that are generated based on deterministic calculation and therefore, these random numbers are not the random numbers that are true (called true random numbers) and have a certain periodicity. In addition, if the initial value is specified, the random numbers are perfectly reproduced; thus, these random numbers essentially have vulnerability. From this perspective, it is necessary to generate the true random numbers that do not have a certain periodicity or the like for practical use.

BRIEF DESCRIPTION OF THE DRAWINGS

FIG. 12B illustrates one example of a circuit of a differential amplifier in the random number generator according to the embodiment;

FIG. 14A illustrates one example of the sequence chart of the random number generator according to the embodiment;

DETAILED DESCRIPTION

A random number generator according to one embodiment includes a write circuit, a read circuit, and a signal output circuit. The write circuit inverts magnetization of a magnetic layer of a magnetic tunnel junction element stochastically by supplying current to the magnetic layer. The read circuit reads the magnetization. The signal output circuit generates a random number on the basis of the magnetization read by the read circuit. The random number generator includes a sequence control circuit that controls the write circuit and the read circuit. The sequence control circuit regulates the write circuit to supply the current to the write circuit in a first period, and causes the read unit to read the magnetization after the first period is finished and then a second period is elapsed, which is longer than the first period.

Embodiments of the present invention are hereinafter described with reference to the drawings. The same structure is denoted by the same reference symbol, and the description of the same structure is not repeated.

First Embodiment

Figure 1:
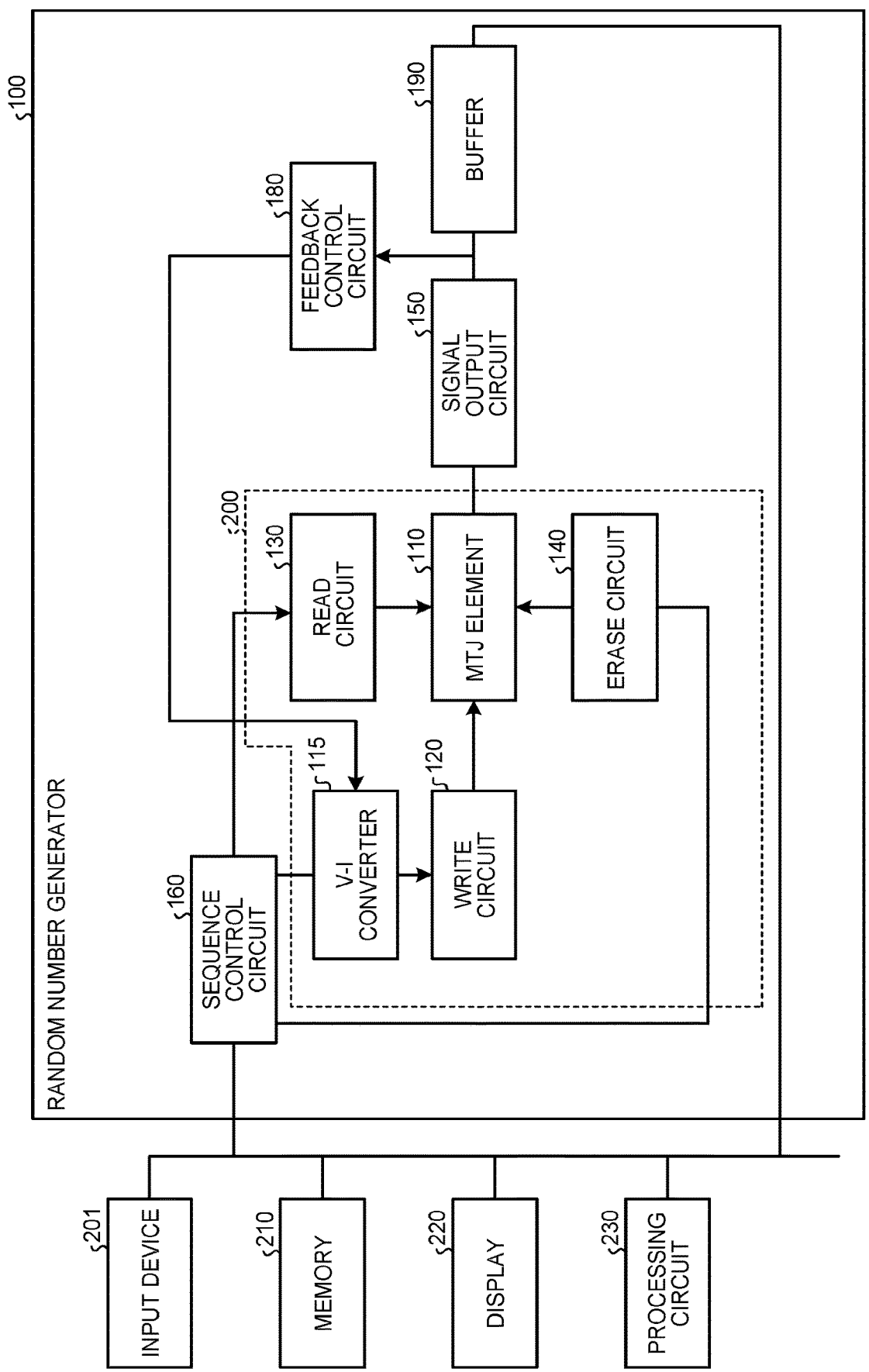
FIG. 1 is a diagram illustrating a random number generator according to an embodiment.

FIG. 1 is a diagram illustrating a random number generator 100 according to a first embodiment, and peripheral devices connected to the random number generator 100. The random number generator 100 includes an MTJ element 110, a sequence control circuit 160, an MTJ control circuit 200, a signal output circuit 150, a buffer 190, and a feedback control circuit 180. The random number generator 100 is connected to an input device 201, a memory 210, a display 220, and a processing circuit 230 as appropriate. The MTJ control circuit 200 includes a V-I converter 115, a write circuit 120, a read circuit 130, and an erase circuit 140. Note that the sequence control circuit 160, the write circuit 120, the read circuit 130, the erase circuit 140, the signal output circuit 150, and the feedback control circuit 180 are one example of a sequence control unit, a write unit, a read unit, an erase unit, a signal output unit, and a feedback control unit, respectively.

The MTJ element 110 is an element that uses magnetic tunnel junction, which is described below. The write circuit 120, the read circuit 130, and the erase circuit 140 are formed by circuits that control the writing, the readout, and the erasure of the MTJ element 110, respectively. The sequence control circuit 160 is formed by, for example, an electronic circuit, and controls the operation of the write circuit 120, the read circuit 130, and the erase circuit 140. Here, to control the write circuit 120, the sequence control circuit 160 applies voltage to the V-I converter 115, which is formed by a predetermined electronic circuit, so that the V-I converter 115 converts the applied voltage into current; thus, the write circuit 120 is controlled. The sequence control circuit 160 typically includes a digital-to-analog converter (DAC) that converts digital input into analog signals. Each of the signal output circuit 150, the buffer 190, and the feedback control circuit 180 is formed by a predetermined electronic circuit or the like. These circuits respectively perform a process of reading a voltage value when readout current is supplied to the MTJ element 110 and generating a random number bit value, a process of accumulating the output random numbers temporarily, and a process of performing feedback control of the random number generator 100.

The input device 201 is a device that receives various instructions or information input from an operator, and examples thereof include a pointing device such as a mouse or a track ball, a selecting device such as a mode selecting switch, and a keyboard. The memory 210 is a memory that stores random numbers generated by the random number generator 100 and various data, and examples thereof include a semiconductor memory element such as a random access memory (RAM) or a flash memory, a hard disk, and an optical disk. The display 220 is a display that displays various analysis results and the like to a user, and examples thereof include a display device such as a liquid crystal display unit.

The random numbers generated by the random number generator 100 are used in a computer program that is executed by the processing circuit 230. The processing circuit 230 is a processor that reads out the computer program from the memory 210 and executes the computer program so as to achieve the function that corresponds to the computer program. Note that the term "processor" means, for example, a circuit such as a central processing unit (CPU), a graphical processing unit (GPU), an application specific integrated circuit (ASIC), a programmable logic device (for example, simple programmable logic device (SPLD)), a complex programmable logic device (CPLD), or a field programmable gate array (FPGA). The processor reads out and executes the computer program saved in the memory 210 so as to achieve the function.

Each part is hereinafter described in detail with reference to FIG. 2 to FIG. 17.

Figure 8:
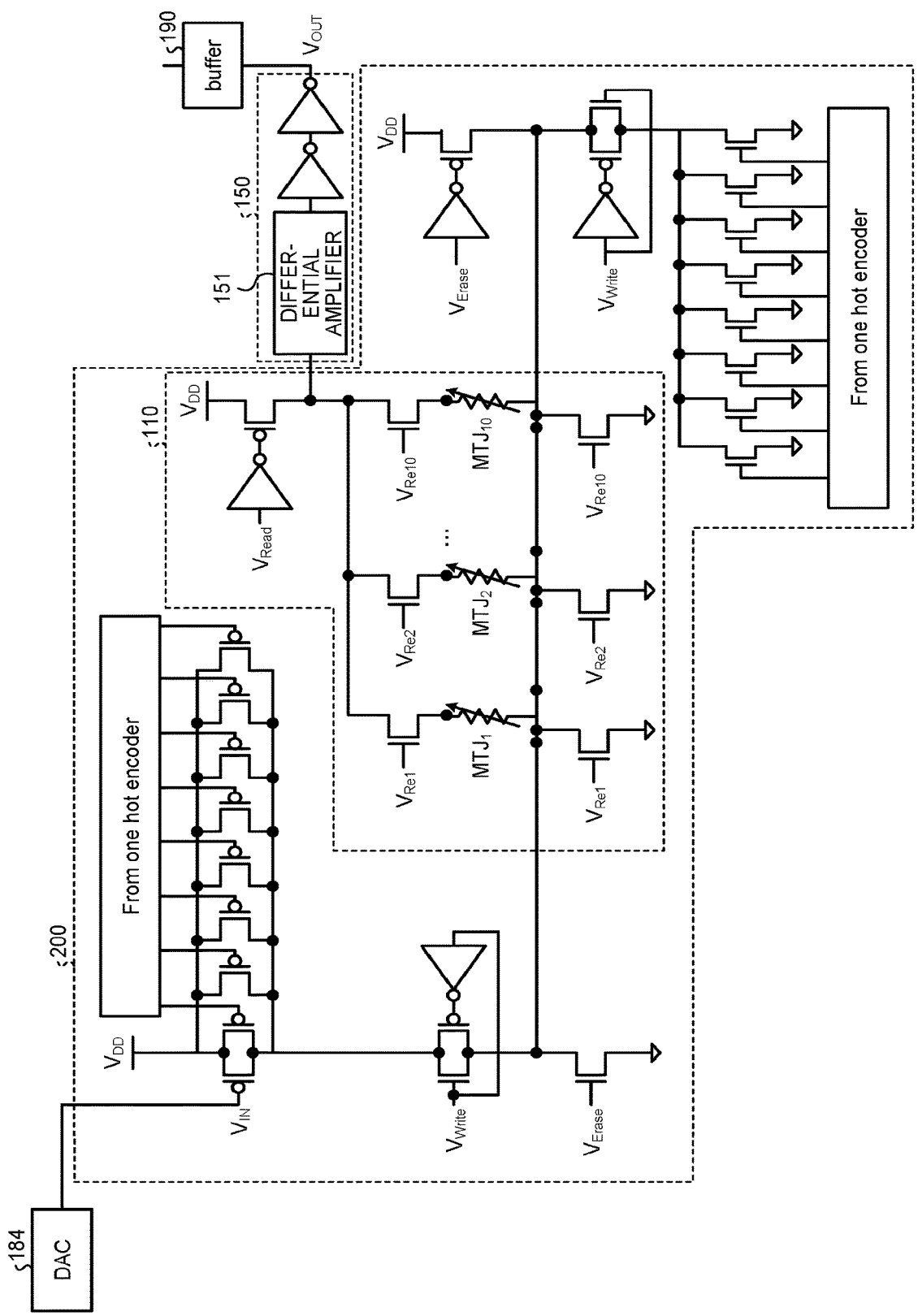
FIG. 8 is a diagram for describing one example of the circuit of the random number generator according to the embodiment in a case where terminals of free layers of the MTJ elements are connected in series.
Figure 9:
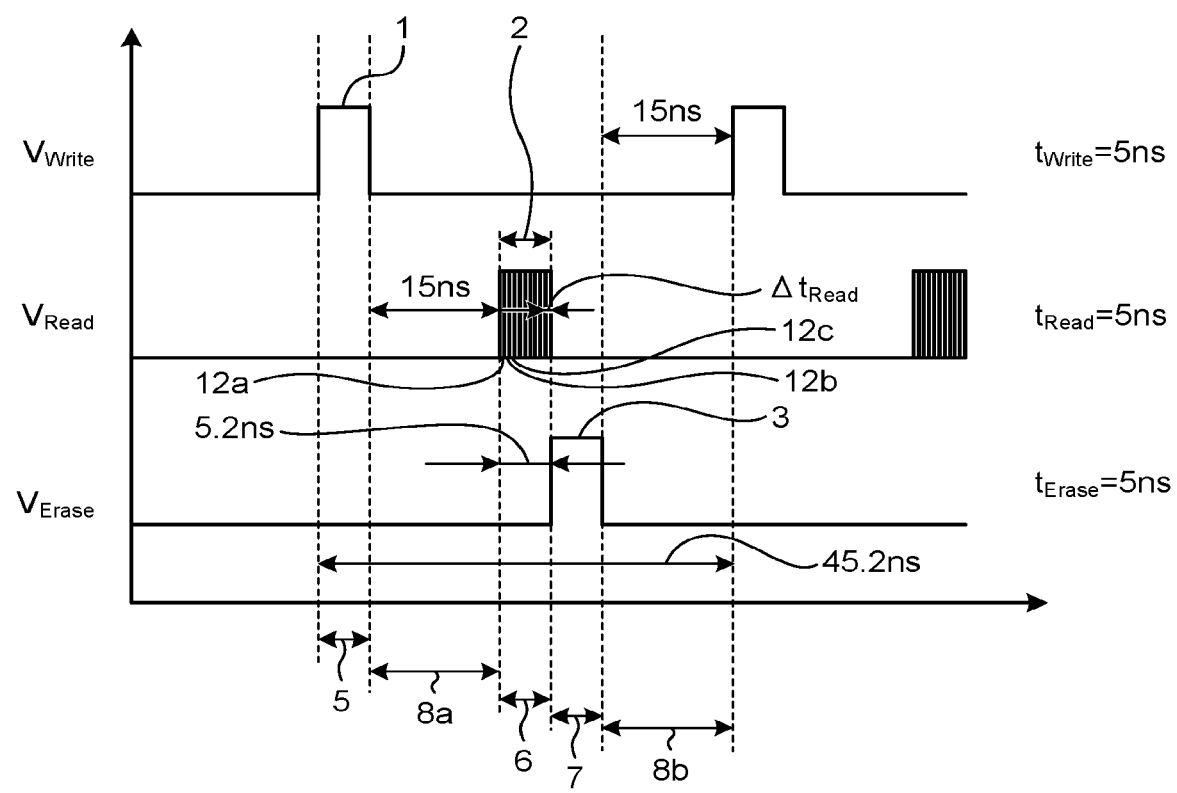
FIG. 9 illustrates one example of the sequence chart of the random number generator according to the embodiment in the case where the terminals of the free layers of the MTJ elements are connected in series.
Figure 15:
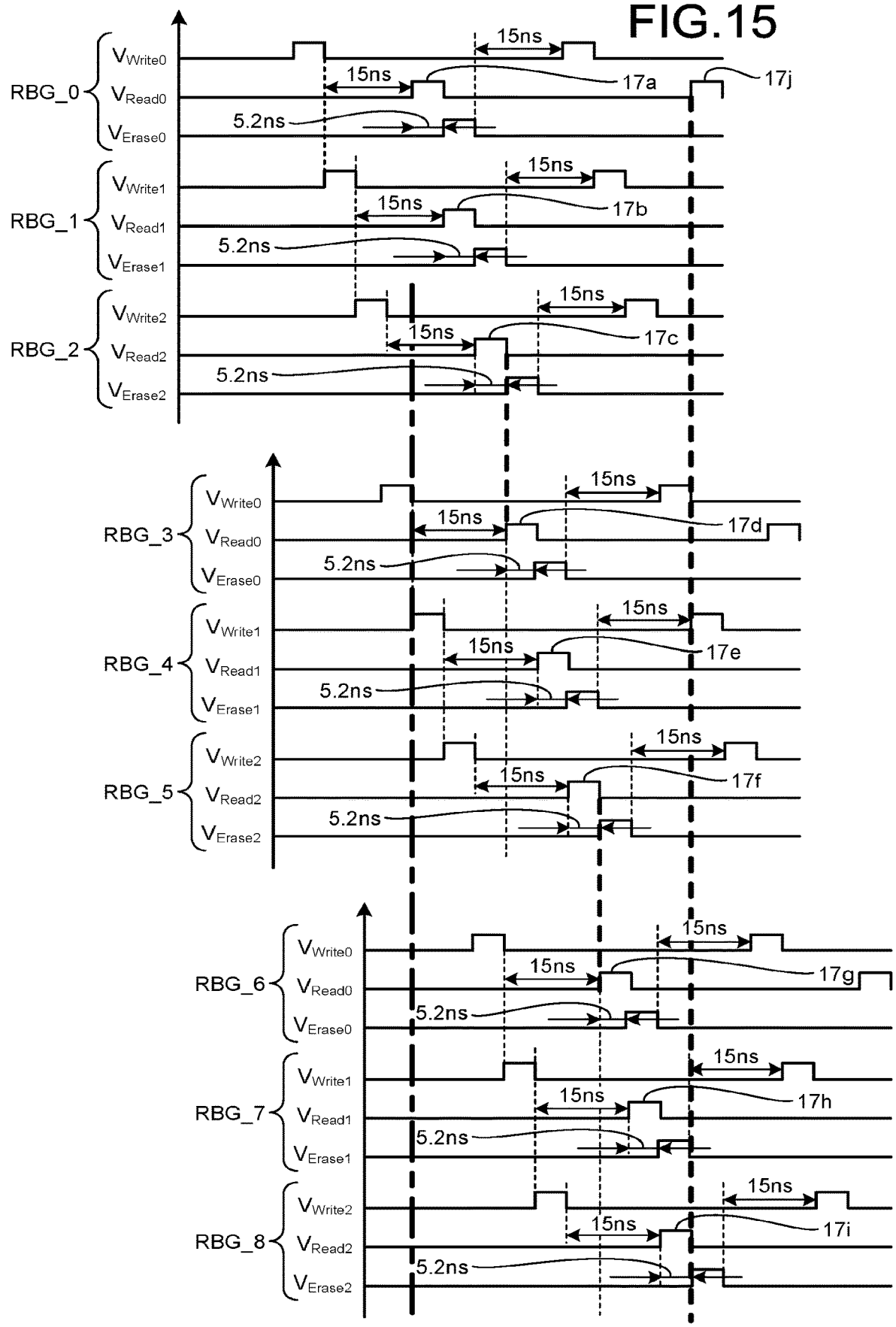
FIG. 15 illustrates another example of the sequence chart of the random number generator according to the embodiment.
Figure 16:
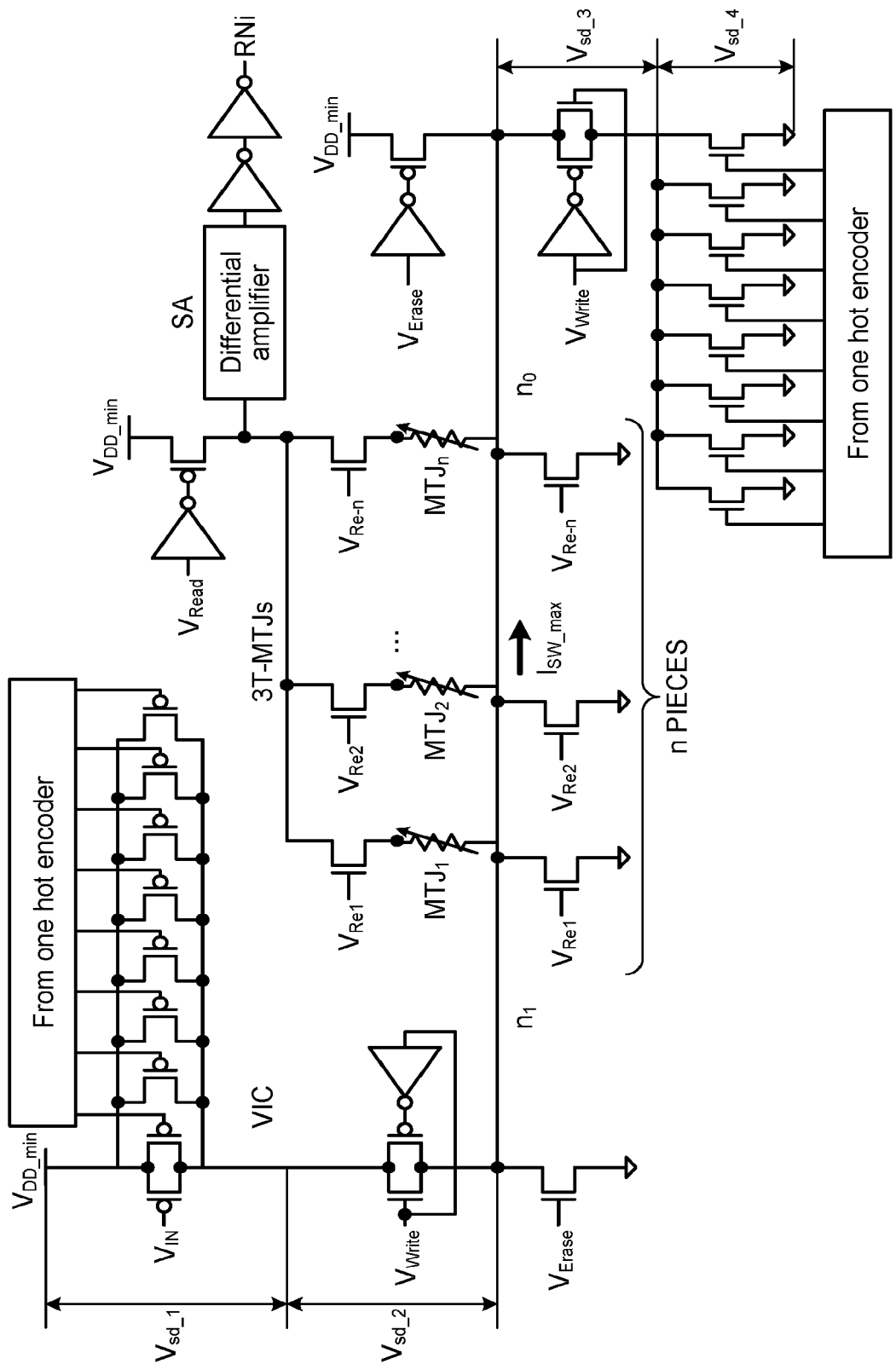
FIG. 16 is a diagram illustrating one example of the circuit of the random number generator according to the embodiment.
Figure 17:
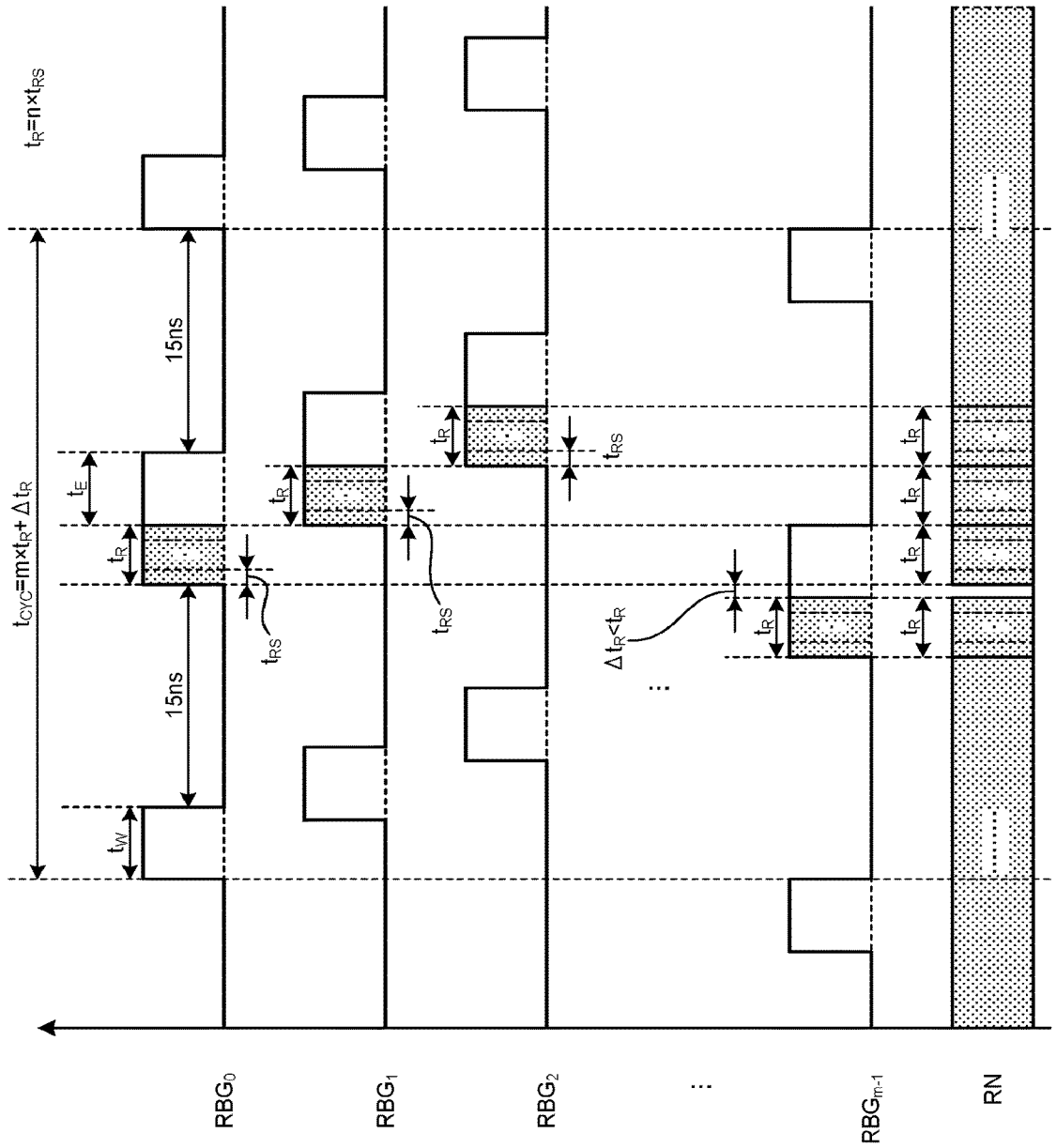
FIG. 17 illustrates another example of the sequence chart of the circuit of the random number generator according to the embodiment.
Figure 18:
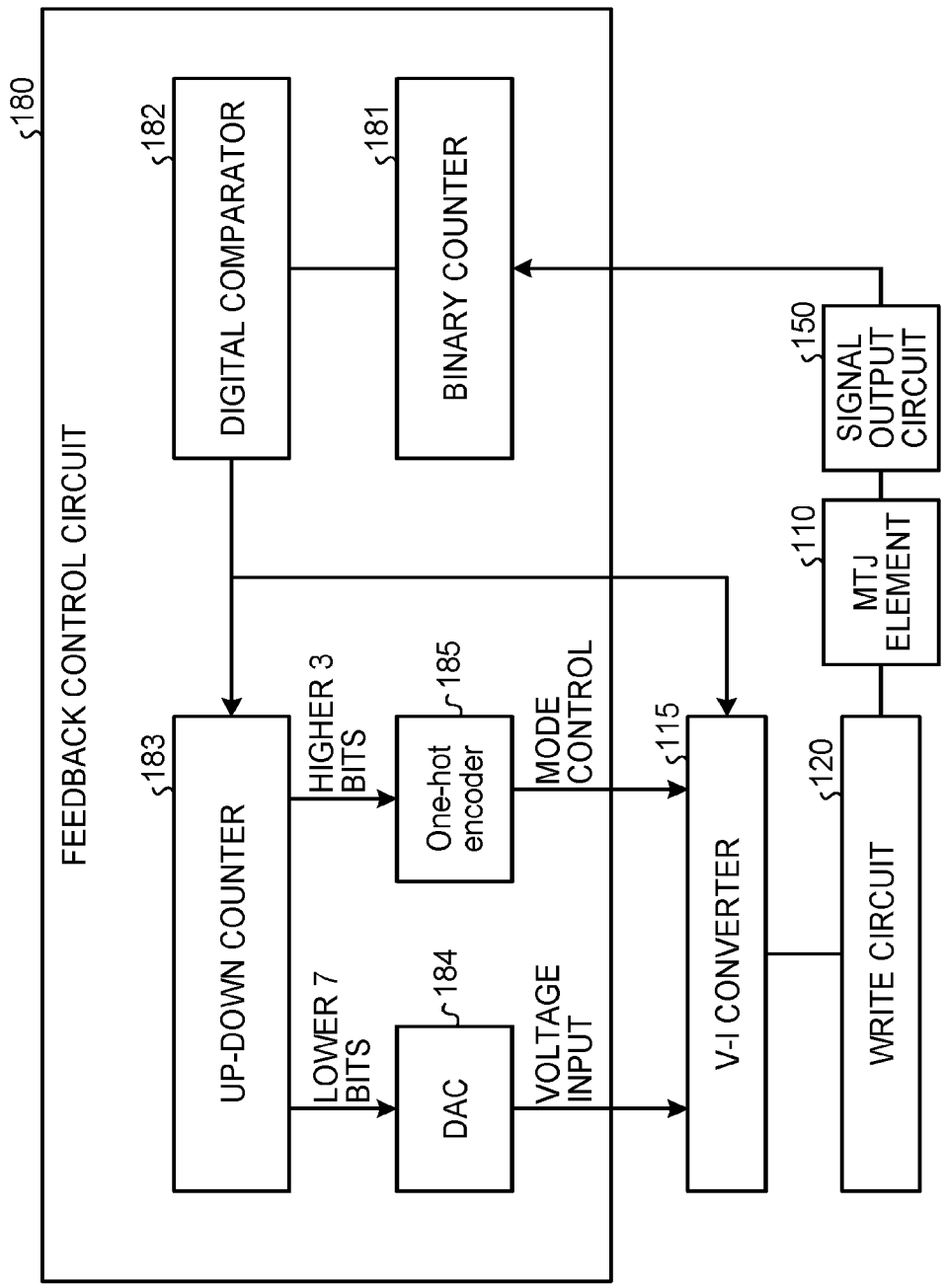
FIG. 18 is a diagram illustrating a structure of a feedback process circuit of the random number generator according to the embodiment.
Figure 19:
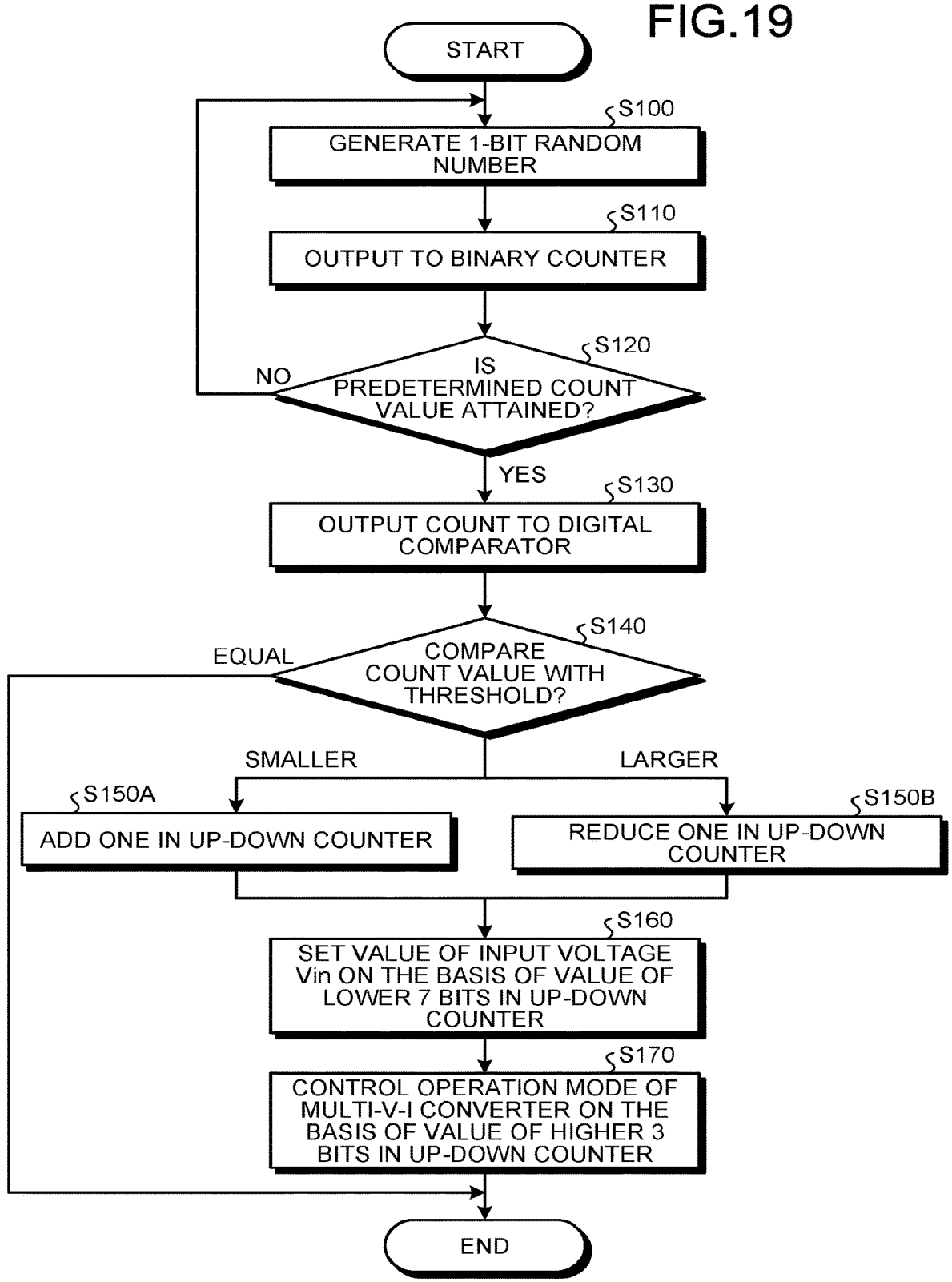
FIG. 19 is a flowchart expressing a procedure of a process of feedback control that is performed by the random number generator according to the embodiment.

First of all, in the entire structure of the present specification, the operation of the magnetic tunnel junction (MTJ) element 110 and the principle of the random number generation are described with reference to FIG. 2. In FIG. 3 to FIG. 7, a structure in which deactivation time is used when the sequence is executed in the random number generator 100 according to the first embodiment is described. In FIG. 8 and FIG. 9, a structure in which a plurality of the MTJ elements 110 are connected in series and disposed is described. In FIG. 10 to FIG. 12C, a structure in which differential amplification is performed in the signal processing of the signal output circuit 150 is described. In FIG. 13 to FIG. 15, a structure in which the MTJ elements 110 that are connected in series are further connected in parallel is described. In FIG. 16 and FIG. 17, another embodiment is described. In FIG. 18 and FIG. 19, the feedback control of the random number generator, particularly three-state feedback control is described.

First, the operation of the magnetic tunnel junction (MTJ) element 110 and the principle of the random number generation by the random number generator 100 according to the embodiment are described with reference to FIG. 2.

Figure 2:
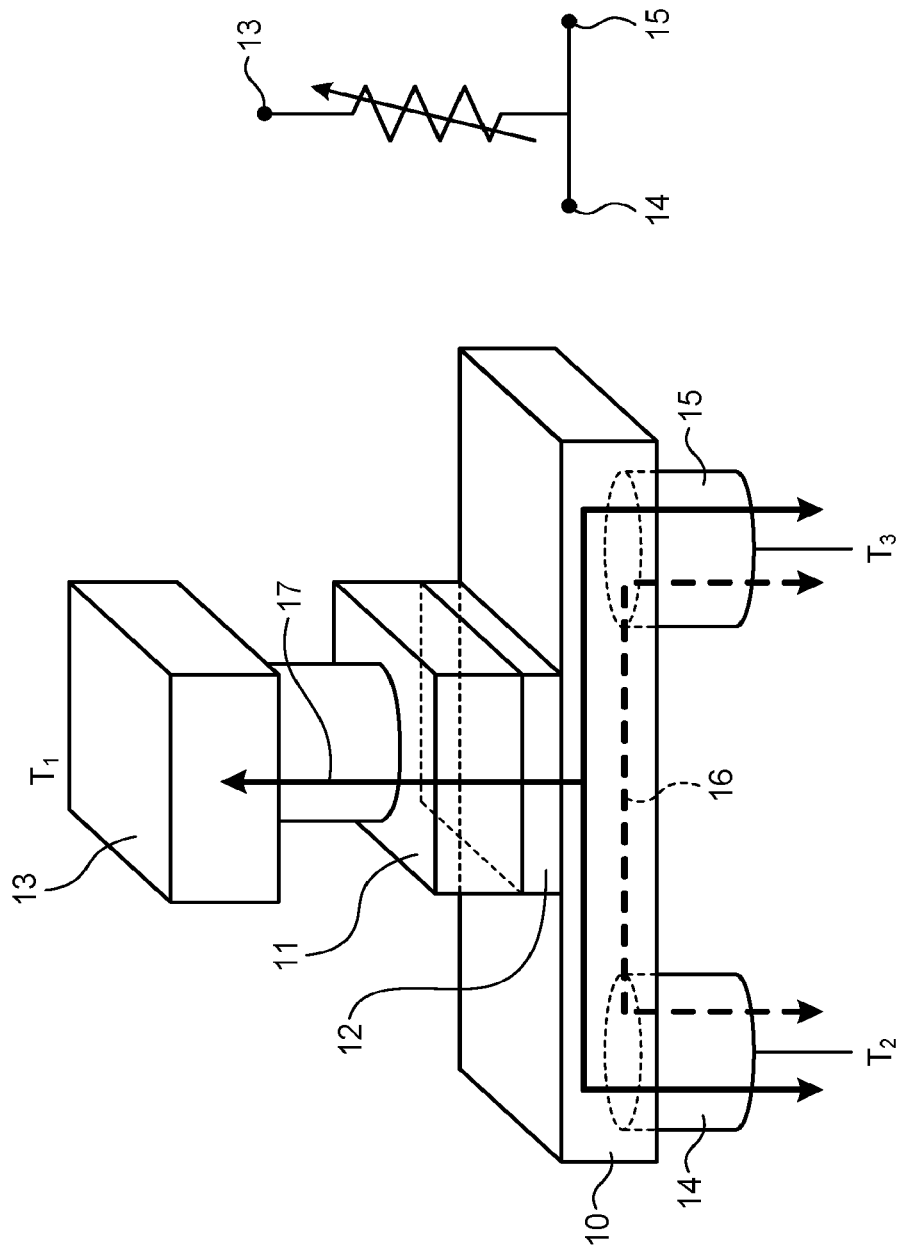
FIG. 2 is a diagram for describing a magnetic tunnel junction element used in the random number generator according to the embodiment.

FIG. 2 illustrates a structure of the magnetic tunnel junction (MTJ) element 110. The MTJ element 110 has a laminate structure in which a thin insulating layer with a thickness of the nanometer level is held between two ferromagnetic layers. Typically, the MTJ element 110 includes: a reference layer 11, which is a ferromagnetic layer whose magnetizing direction is not inverted easily; a free layer 10, which is a ferromagnetic layer whose magnetizing direction is inverted easily; and an insulator 12 (tunnel barrier) between the reference layer 11 and the free layer 10. Here, by the tunnel magnetoresistance (TMR) effect, the electric resistance between the reference layer 11 and the free layer 10 changes depending on the direction of the magnetization of the free layer 10 with respect to the magnetization of the reference layer 11. Specifically, when the magnetizing directions are the same, the resistance is low and when the magnetizing directions are opposite, the resistance is high. By utilizing this change, the MTJ element 110 can be used as a memory, for example.

Incidentally, for the MTJ element 110, the magnetizing direction of the free layer 10 can be inverted by spin injection magnetization reversal. That is to say, in FIG. 2, if the write circuit 120 supplies writing current 16 to the free layer 10 of the MTJ element 110 from the left to the right, from a terminal 14 to a terminal 15, for example, the magnetizing direction of the free layer 10 is inverted with a certain probability in accordance with the supplied current. Here, in the case where the magnetizing direction of the free layer 10 is inverted, the electric resistance between the reference layer 11 and the free layer 10 changes; thus, when the read circuit 130 supplies readout current 17 between a terminal 13 and the terminal 14 and the terminal 15, that is, between the reference layer 11 and the free layer 10 with the insulator 12 held therebetween and the voltage value between the terminal 13 and the terminal 14 and the terminal 15 is measured, the electric resistance between the reference layer 11 and the free layer 10 can be read out. Note that the probability that the magnetizing direction of the free layer 10 is inverted changes depending on the amount of current supplied by the write circuit 120, and at the smallest amount of current, the probability that the magnetizing direction is inverted is almost 0% and at the largest amount of current, the probability that the magnetizing direction is inverted is almost 100%. That is to say, by selecting the amount of current that is supplied by the write circuit 120 as appropriate, the probability that the magnetizing direction of the free layer 10 is inverted can be adjusted to become about 50%. In the case of using the MTJ element 110 as the random number generator, the value of the current the write circuit 120 supplies in writing is set to be the value at which the probability that the magnetizing direction of the free layer 10 is inverted becomes about 50%, which will be described below.

In addition, the magnetization of the free layer 10 of the MTJ element 110 can be reset when the erase circuit 140 supplies to the free layer 10 sufficiently large current in a direction opposite to the writing direction, that is, the current that makes the probability that the magnetizing direction of the free layer 10 is inverted and returned to the original state is almost 100%.

Subsequently, the random number generation using the MTJ element 110 is described.

Some methods for generating random numbers use predetermined mathematical algorithms. The random numbers generated by the mathematical algorithms, however, are pseudo-random numbers that are generated based on deterministic calculation in fact, and therefore, these random numbers are not the true random numbers and have a certain periodicity. From such a perspective, it is desirable to generate the random numbers that do not have a certain periodicity. Here, for example, when the phenomenon of the magnetization reversal at the current supply is used in the random number generation, the reversal of the magnetization when the current is supplied is the stochastic process applied by quantum mechanics and thus, the non-periodicity of the generated random numbers is assured physically.

Here, as described above, when the write circuit 120 supplies the predetermined writing current described above, the magnetizing direction of the free layer 10 is inverted with a probability of about 50%. Therefore, after the write circuit 120 supplies the writing current, the read circuit 130 measures the electric resistance between the reference layer 11 and the free layer 10 and then the high-resistance state is defined as "1" and the low-resistance state is defined as "0"; then, a binary signal that becomes "1" and "0" with a probability of 50% with respect to the writing current of the write circuit 120 can be obtained. Accordingly, the MTJ element 110 can be used as the random number generator 100.

Subsequently, the control performed by the sequence control circuit 160 is described. The sequence control circuit 160 sends a control signal to the write circuit 120, the read circuit 130, and the erase circuit 140 so as to control the MTJ element 110.

First, the control performed by the sequence control circuit 160 in the random number generator 100 according to a comparative example is described.

Figure 3:
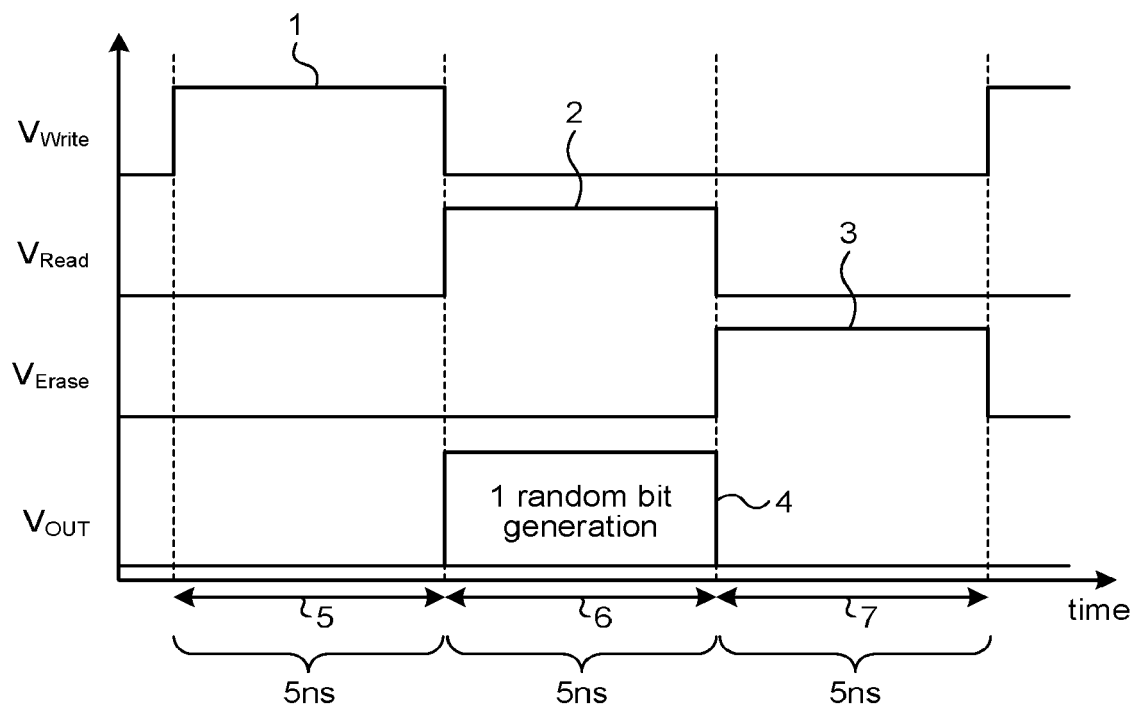
FIG. 3 is a diagram for describing one example of a sequence chart of a random number generator according to a comparative example.

FIG. 3 illustrates one example of the sequence performed by the sequence control circuit 160 in the random number generator 100 according to the comparative example.

First, the sequence control circuit 160 applies writing voltage 1 to the V-I converter 115 in a writing period 5. The write circuit 120 supplies the writing current 16 generated by the V-I converter 115 to the free layer 10 in the MTJ element 110. Thus, the magnetization of the free layer 10 is inverted with a certain probability. Subsequently, in a readout period 6 immediately after the writing period 5, the read circuit 130 that is controlled by the sequence control circuit 160 applies readout voltage 2. Thus, the resistance between the free layer 10 and the reference layer 11 is read out. The signal output circuit 150 generates a 1-bit random number 4 on the basis of the voltage value when reading current is supplied to the MTJ element 110. Subsequently, the erase circuit 140 that is controlled by the sequence control circuit 160 applies erasing voltage 3 and supplies current in a direction opposite to the writing current 16 in an erasing period 7. Thus, the magnetization of the free layer 10 in the MTJ element 110 is reset. Here, the writing period 5, the readout period 6, and the erasing period 7 are each about 5 ns and these periods are generally successive.

However, in such a sequence chart in this comparative example, the quality of the generated random number may deteriorate.

In view of this, we have paid attention to the fact that accumulation of charges in the free layer 10 is one of the reasons why the random number generated in the case of using the sequence chart in the comparative example in FIG. 3 deteriorates in quality.

Figure 4:
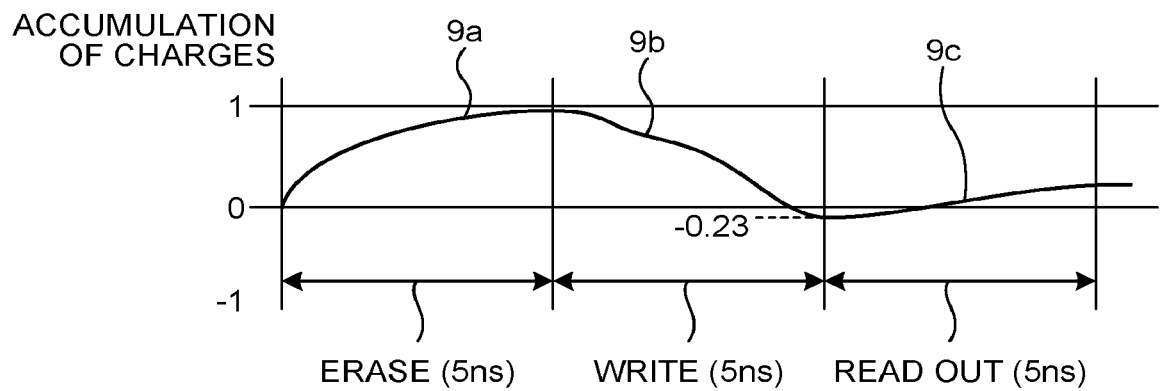
FIG. 4 is a diagram for describing accumulation of charges in an MTJ element in the random number generator according to the comparative example.

FIG. 4 illustrates a simulation result of simulating the charges accumulated in the free layer 10 in the sequence chart according to the comparative example. That is to say, in the case of performing the sequence chart according to the comparative example, the parameter of the charge accumulation changes from 0 to 1 and the charges are accumulated in the erasing period 7 as indicated by a graph 9a. Next, as indicated by a graph 9b, the parameter of the charge accumulation changes from 1 to −0.23 in the writing period 5. Subsequently, as indicated by a graph 9c, the parameter of the charge accumulation recovers gradually from −0.23 in the readout period 6.

That is to say, in the sequence according to the comparative example, the parameter of the charge accumulation is a value that is not zero at the start of the readout period 6 and a part of the charges remains in the free layer 10 at the start of the readout period 6. As a result, the quality of the generated random number may deteriorate.

The embodiment is based on the aforementioned knowledge. That is to say, the random number generator 100 according to the embodiment includes: the write circuit 120 that inverts the magnetization of a magnetic layer of a magnetic tunnel junction element stochastically by supplying current to the magnetic layer; the read circuit 130 that reads the magnetization; the signal output circuit 150 that generates a random number on the basis of the magnetization read by the read circuit 130; and the sequence control circuit 160 that controls the write circuit 120 and the read circuit 130. The sequence control circuit 160 regulates the write circuit 120 to supply the current to the write circuit 120 in a first period, and causes the read circuit 130 to read the magnetization after the first period is finished and then a second period is elapsed. Here, the second period is typically longer than the first period, and for example, the second period is a period three times or longer than the first period and for example, 15 ns or more. Thus, the quality of the generated random number can be improved.

Figure 5:
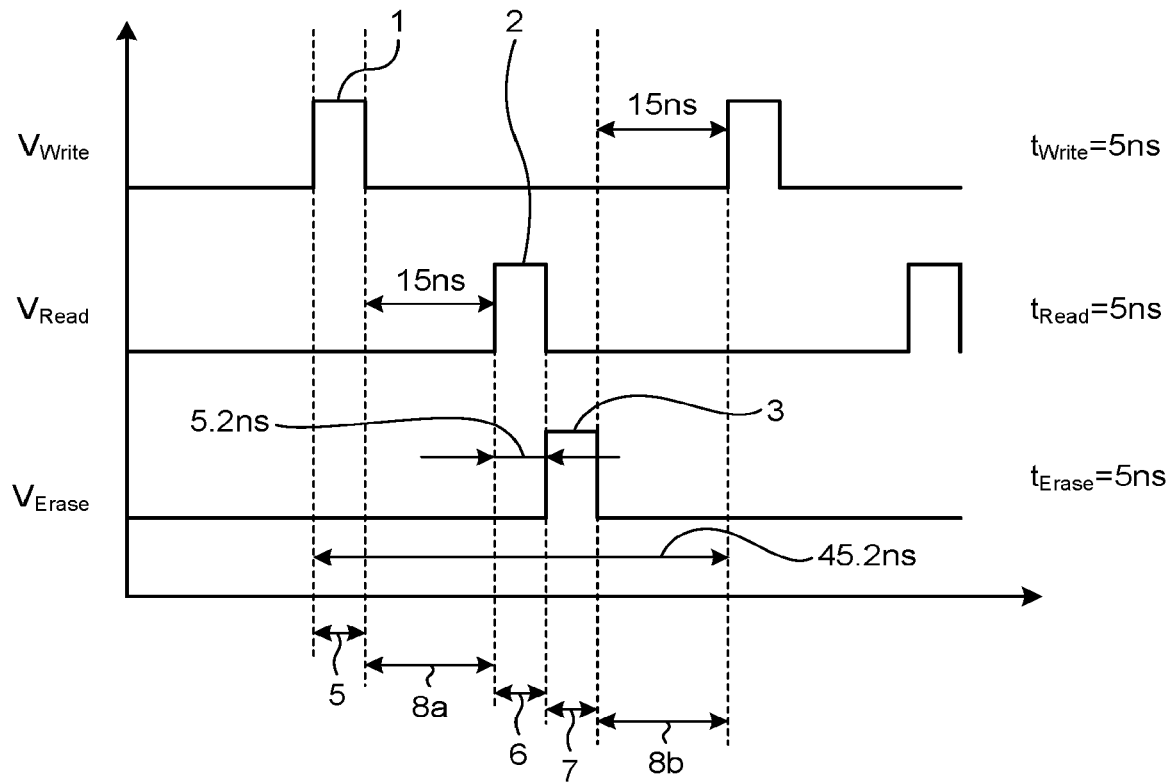
FIG. 5 illustrates one example of a sequence chart of the random number generator according to the embodiment.

FIG. 5 illustrates one example of the sequence that is performed by the sequence control circuit 160 in the random number generator 100 according to the embodiment.

First, the sequence control circuit 160 controls so that the writing voltage 1 is applied to the V-I converter 115 and the current flows in the write circuit 120 in the writing period 5, which corresponds to the first period. For example, the writing period 5 is 5 ns and the writing current is 100 µA.

Subsequently, the sequence control circuit 160 deactivates the read circuit 130 for a second period 8a corresponding to the time until the charges accumulated in the free layer 10, which is a magnetic layer, disappear. The second period 8a is hereinafter referred to a deactivation time, as necessary. The second period 8a corresponding to the time until the charges accumulated in the free layer 10, which is a magnetic layer, disappear is typically longer than the first period 5, and for example, three times or longer than the first period, for example 15 ns.

Subsequently, in the readout period 6 after the end of the first period and the second period 8a, the sequence control circuit 160 causes the read circuit 130 to apply the readout voltage 2 and read the magnetization. For example, the readout period is 5 ns and the readout current is about 10 μA.

Subsequently, the sequence control circuit 160 applies the erasing voltage 3 to the erase circuit 140 in the erasing period 7 and resets the magnetization of the free layer 10 in the MTJ element 110. Here, the erasing current is about −600 μA.

Next, the sequence control circuit 160 deactivates the write circuit 120 for a third period 8b corresponding to the time until the charges accumulated in the free layer 10, which is a magnetic layer, disappear by the erase circuit 140. The third period 8b corresponding to the time until the charges accumulated in the free layer 10, which is a magnetic layer, disappear by the erase circuit 140 is typically longer than the erasing period 7, and for example, three times or longer than the erasing period, for example 15 ns.

Figure 6:
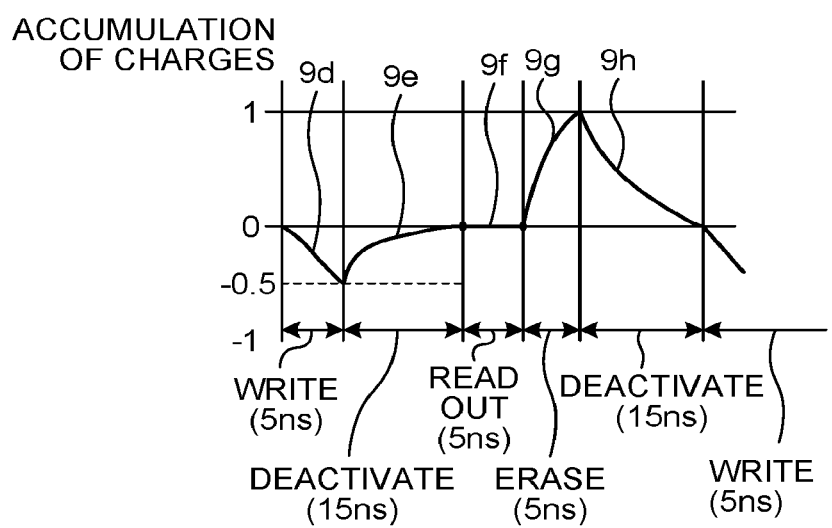
FIG. 6 is a diagram for describing accumulation of charges in the MTJ element in the random number generator according to the embodiment.

FIG. 6 illustrates a simulation result of simulating the charges accumulated in the free layer 10 in the sequence chart according to the embodiment. That is to say, in the case of performing the sequence chart according to the embodiment, the parameter expressing the charge accumulation changes from 0 to −0.5 due to a writing period 9d as indicated by a graph 9d. After the writing period 9d ends, the charges are accumulated in the free layer 10 but with a deactivation time for 15 ns, the parameter expressing the charge accumulation becomes zero at the end of the deactivation time as indicated by a curve 9e. As a result, as indicated by a graph 9f, the parameter expressing the charge accumulation in the readout period transits with zero. Accordingly, the quality of the generated random numbers is improved.

Next, as indicated by a graph 9g, the parameter expressing the charge accumulation changes from 0 to 1 by an erasing period 9g and after the erasing period 9g ends, the charges are accumulated in the free layer 10 but with a deactivation time for 15 ns, the parameter expressing the charge accumulation becomes zero at the end of the deactivation time as indicated by a curve 9h. In other words, in FIG. 4 and FIG. 6, the parameter expressing the charge accumulation in MTJ described above is defined by a reversal probability P of the magnetization, and is equal to the reversal probability P when positively charged with the erasing or writing current and exhibits an operation equal to the value with a negative sign to the reversal probability P when negatively charged. As a result, the next writing cycle can be started from the state in which the parameter expressing the charge accumulation is zero, and thus the quality of the generated random number is improved.

Thus, the period until the charges accumulated in the magnetic layer disappear is incorporated in the sequence as the deactivation time; therefore, the quality of the generated random number can be improved.

Figure 7:
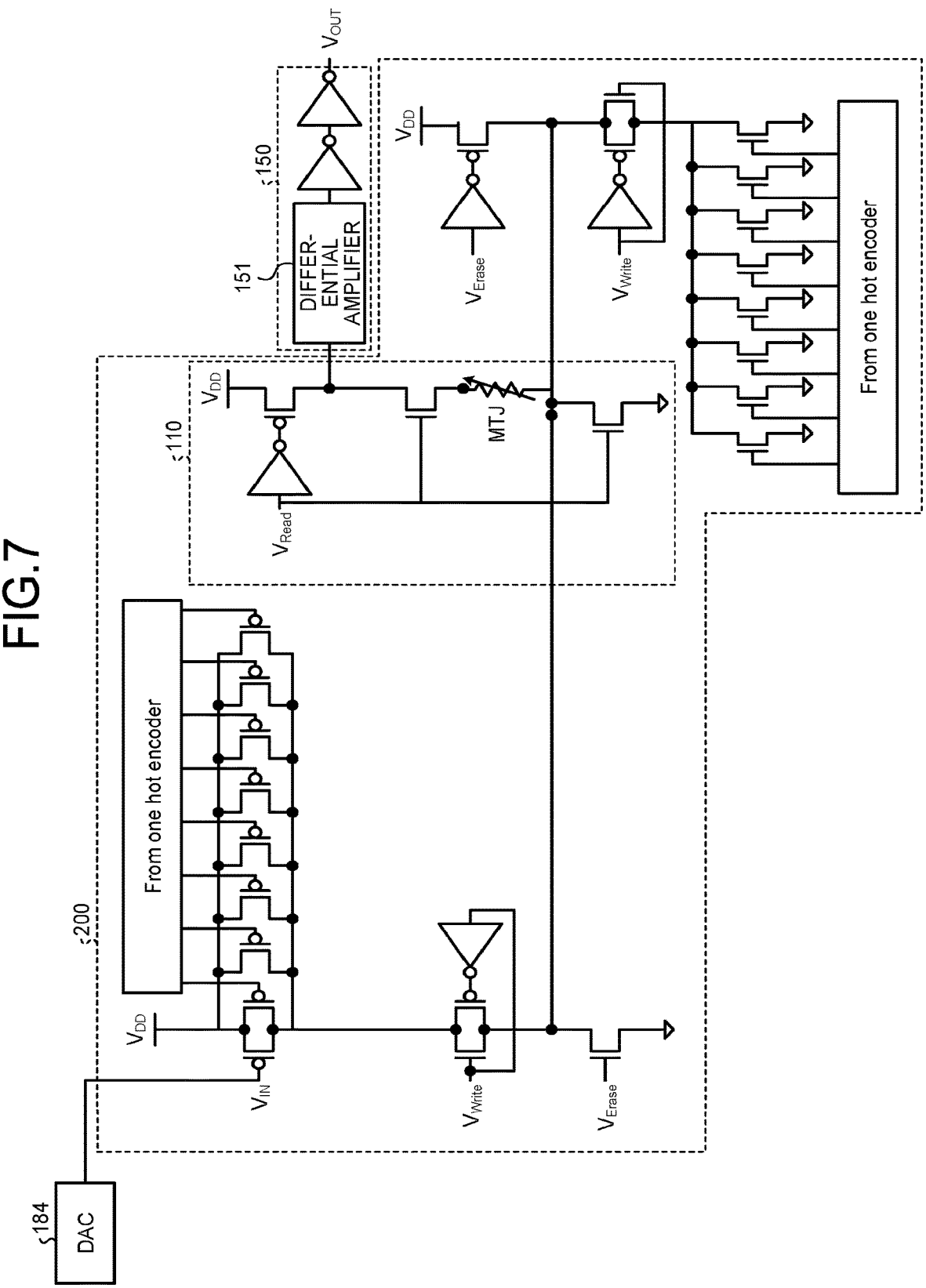
FIG. 7 illustrates one example of a circuit of the random number generator according to the embodiment in the case of using one MTJ element.

FIG. 7 illustrates a circuit structure of the random number generator 100 in the case of using one MTJ element. In FIG. 1 and FIG. 7, the structures denoted by the same reference signs are the structures that correspond to each other. Note that a differential amplifier 151 and a DAC 184 are described with reference to FIG. 10 and FIG. 18.

Note that in the description made with reference to FIG. 5 and FIG. 7, the random number generator 100 generates the random number using only one MTJ element 110; however, the embodiment is not limited to this example. The random number generator 100 may have more than one MTJ elements 110 disposed in serial connection. In this structure, the random number can be generated regarding the MTJ elements 110 with one current injection. With reference to FIG. 8 and FIG. 9, the structure having the magnetic tunnel junction elements 110 in serial connection is described. FIG. 8 illustrates one example of the circuit in the case where the MTJ elements are connected in series, and FIG. 9 illustrates one example of the sequence chart in this case.

In FIG. 8, the MTJ elements 110, $MTJ_1$ to $MTJ_{10}$, are connected in series. Here, when the MTJ elements 110, $MTJ_1$ to $MTJ_{10}$, are connected in series, it means the free layers 10 of these elements are connected in series. Therefore, once the write circuit 120 supplies current, the magnetizing direction of the free layer 10 of each MTJ element 110 is inverted by this current at one time with a certain probability. That is to say, the writing with respect to the MTJ elements 110 is performed at the same time. In other words, when the current is supplied to the MTJ elements 110, the write circuit 120 inverts the magnetization of the magnetic layer of each MTJ element independently stochastically. Since the reversal of the magnetizing direction by the current is a stochastic phenomenon, the reversal of the magnetizing direction in a certain MTJ element 110 does not always cause the similar reversal of the magnetizing direction in the next MTJ element 110. Whether the magnetizing direction is inverted is observed independently for each MTJ element 110.

On the other hand, as is understood from the circuit diagram in FIG. 8, readout from the MTJ element 110 is carried out independently for each MTJ element 110. That is to say, readout from the MTJ element 110 is carried out sequentially for each MTJ element 110. That is to say, the read circuit 130 reads the magnetization (that is, the magnitude of the resistance value in accordance with the magnetization state) of each MTJ element.

FIG. 9 illustrates one example of the sequence chart in the case where the magnetic tunnel junction elements 110 are connected in series. FIG. 9 is the same as FIG. 5, which is the sequence chart in the case where the random number is generated using one magnetic tunnel junction element 110, except for the readout voltage 2 that is applied in the readout period 6; therefore, the description is not repeated. In the case where the magnetic tunnel junction elements 110 are connected in series, the readout period 6 includes readout periods 12a, 12b, 12c, . . . of the respective MTJ elements. For example, the read circuit 130 reads out the first MTJ element $MTJ_1$, in the readout period 12a, reads out the second MTJ element $MTJ_2$ in the readout period 12b, and reads out the third MTJ element $MTJ_3$, in the readout period 12c. These readouts are performed sequentially.

Thus, the random bit is generated independently for each MTJ element; therefore, the random number generator 100 according to the embodiment can generate the random number with a plurality of bits in one readout period 6 and the random number can be generated more efficiently.

Next, the signal processing of the signal output circuit 150 for the output signal from the MTJ element 110 is described with reference to FIG. 10 to FIG. 12C.

Figure 10:
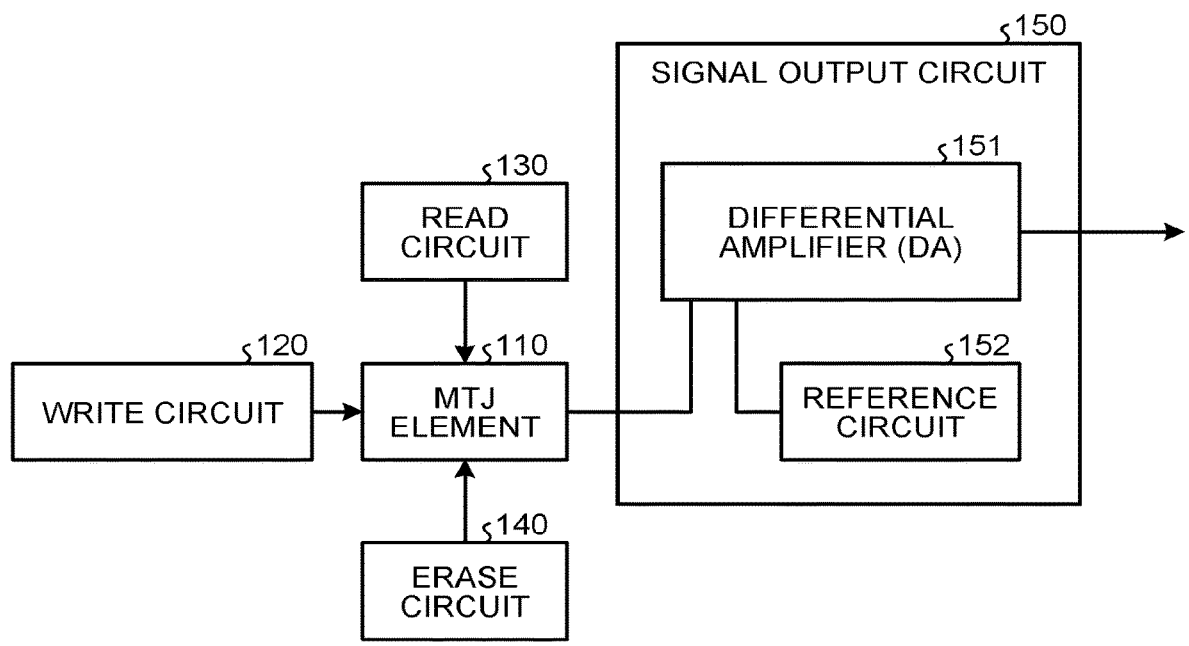
FIG. 10 is a diagram illustrating a structure of a signal output circuit in the random number generator according to the embodiment.

FIG. 10 is a diagram illustrating a structure of the signal output circuit in the random number generator according to the embodiment. As illustrated in FIG. 10, in the embodiment, the differential amplifier 151 amplifies the difference between the voltage resulting from the readout current that the read circuit 130 supplies to the MTJ element 110 and the voltage resulting from the reference current obtained by a reference circuit 152, which is described below, and thus, the signal output circuit 150 generates the output signal.

Figure 11:
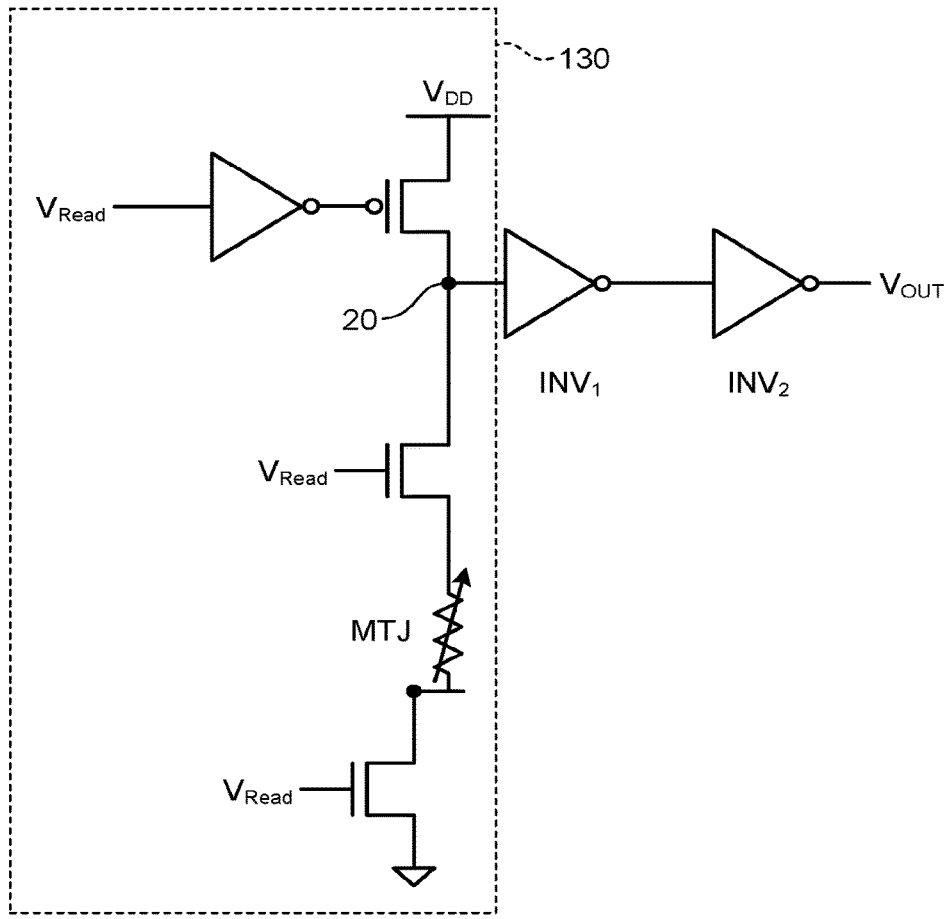
FIG. 11 is a diagram for describing the background of the embodiment.

First, with reference to FIG. 11, the background of the signal output circuit 150 having the aforementioned structure is described. FIG. 11 illustrates one example of the circuit structure of the read circuit 130. In the circuit in FIG. 11, output voltage 20 in the read circuit 130 and threshold voltage $V_{TH1}$ of an inverter $INV_1$ are compared and for example, if the output voltage 20 is higher than the threshold voltage $V_{TH1}$, the output result $V_{OUT}$ is 1 and if the output voltage 20 is lower than the threshold voltage $V_{TH1}$, the output result $V_{OUT}$ is 0. Here, in the usual design, if the MTJ element 110 has low resistance, the output voltage 20 is lower than the threshold voltage $V_{TH1}$ and on the contrary, if the MTJ element 110 has high resistance, the output voltage 20 is higher than the threshold voltage $V_{TH1}$.

However, the electronic circuit of the read circuit 130 is influenced by the resistance variation of the elements including the MTJ element 110 and the switching element circuit itself. As a result, for example, the output voltage 20 becomes higher than the threshold voltage $V_{TH1}$ although the MTJ element 110 has low resistance, or the output voltage 20 becomes lower than the threshold voltage $V_{TH1}$ although the MTJ element 110 has high resistance. Accordingly, 0 or 1 is always output and the circuit may fail to operate correctly.

In view of the above background, in the random number generator 100 according to the embodiment, the signal output circuit 150 includes the reference circuit 152 that is used to acquire the electric characteristics of the magnetic tunnel junction element. Subsequently, the differential amplifier 151 performs differential amplification between the signal output from the read circuit 130 and the signal output from the reference circuit, generates a differential amplification signal, based on which the random number is generated, and then outputs the differential amplification signal to the circuit in the subsequent stage. Thus, the operation of the read circuit 130 that is influenced by the variation of the circuit itself can be stabilized.

Figure 12A:
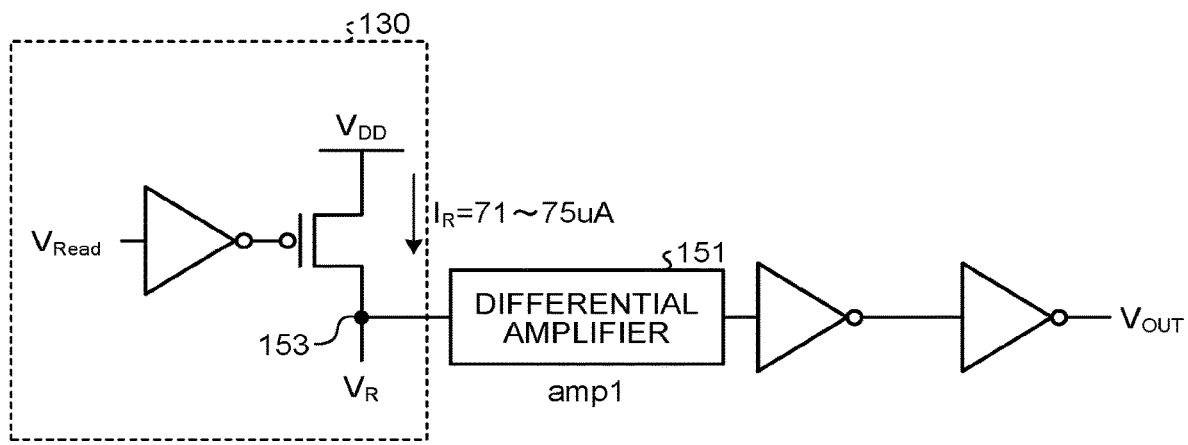
FIG. 12A is a diagram illustrating one example of the signal output circuit in the random number generator according to the embodiment.
Figure 12C:
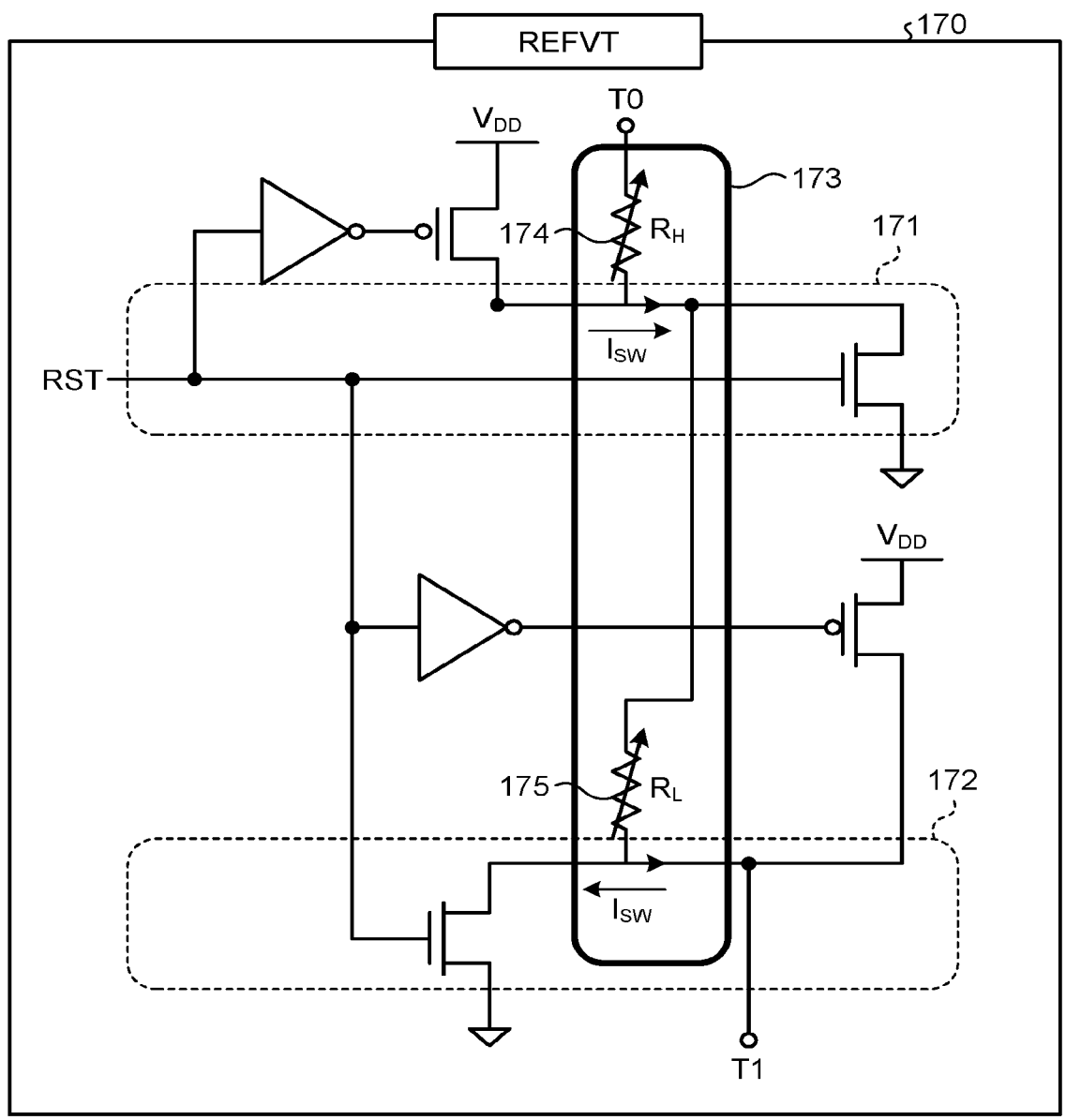
FIG. 12C illustrates one example of a circuit of a reference circuit in the random number generator according to the embodiment.
Figure 13:
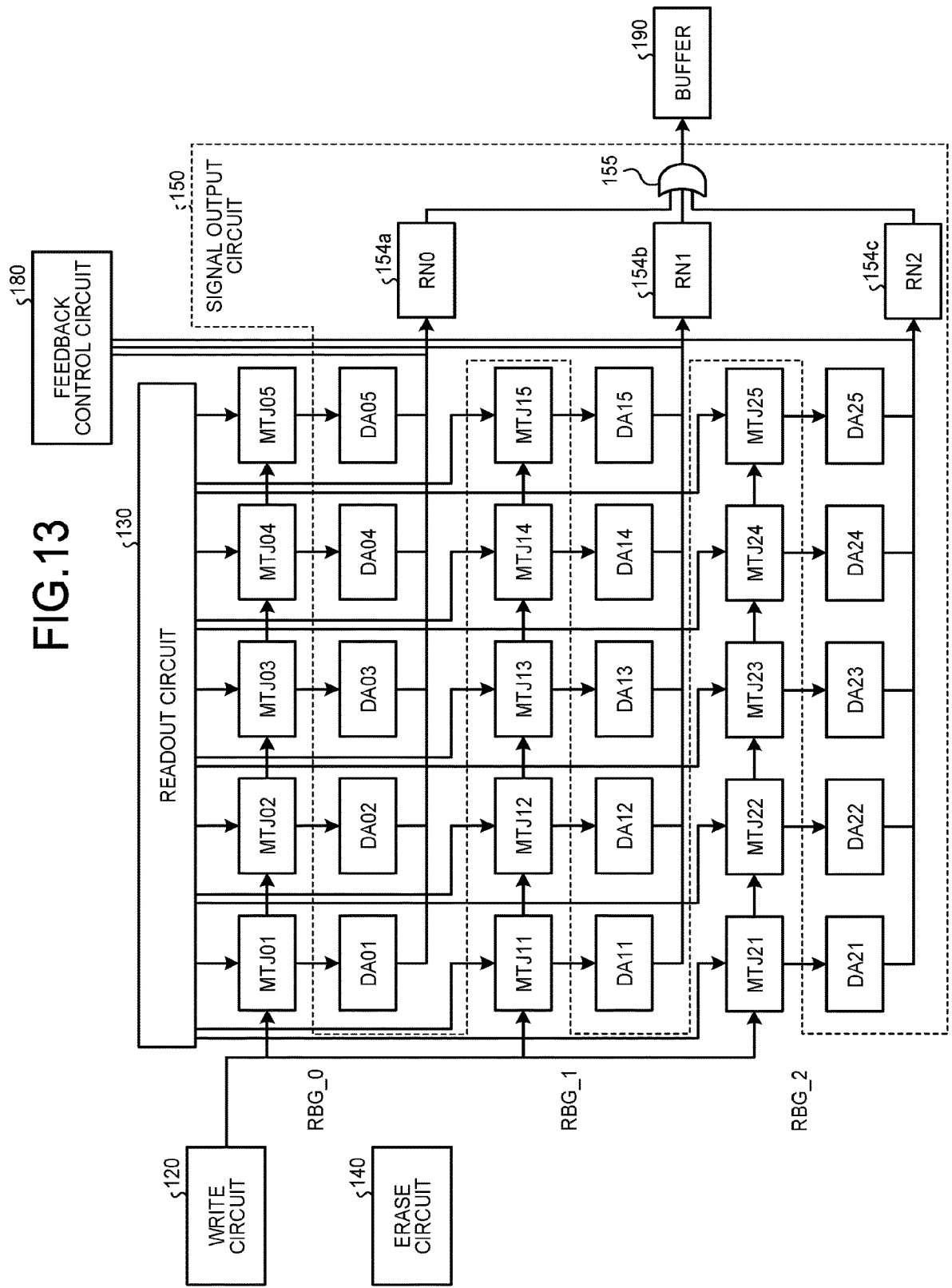
FIG. 13 illustrates one example of the signal output circuit of the random number generator according to the embodiment in the case where the MTJ elements that are connected in series are further connected in parallel.

FIG. 12A, FIG. 12B, and FIG. 12C each illustrate one example of the circuit structure. FIG. 12A illustrates the entire structure of the signal output circuit 150, and the read circuit 130 and the differential amplifier 151 in FIG. 12A correspond to the corresponding components in FIG. 10. FIG. 12B is a diagram that more specifically illustrates the differential amplifier 151 and the reference circuit 152 that is connected to the differential amplifier 151. As illustrated in FIG. 12B, the differential amplifier 151 amplifies the difference between output voltage 153 from the read circuit 130 and output voltage from the reference circuit 152, and outputs the result to the circuit in the subsequent stage. Here, when the voltage when the MTJ element 110 has low resistance is $V_L$ and the voltage when the MTJ element 110 has high resistance is $V_H$, the voltage output from the reference circuit 152 is designed so that $(V_L+V_H)/2$ is satisfied, for example. Thus, when the MTJ element 110 has low resistance, the signal output circuit 150 can output the signal value "0" to the circuit in the subsequent stage and when the MTJ element 110 has high resistance, the signal output circuit 150 can output the signal value "1" to the circuit in the subsequent stage stably.

Next, the operation of the reference circuit 152 is described. FIG. 12C is an internal circuit diagram of the circuit 170 that determines the reference resistance value of the MTJ element in the reference circuit 152. Here, the circuit 170 in the reference circuit 152 includes two MTJ elements that are connected in series. Here, the serial connection is, unlike the aforementioned connection, the connection when the MTJ element is regarded as a potentiometer. For example, as illustrated in FIG. 12C, an MTJ element 174 and an MTJ element 175 in the circuit 170 are disposed in serial connection in a path 173 when the resistance is read out.

Here, the reference circuit 152 is adjusted so that, by supplying large current to the MTJ element 174 and the MTJ element 175 in opposite directions using a writing path 171 and a writing path 172, one of the resistance of the MTJ element 174 and the resistance of the MTJ element 175 serves as the resistance at the low resistance and the other serves as the resistance at the high resistance. For example, by supplying current to the MTJ element 174 and the MTJ element 175 in opposite directions as indicated in FIG. 12C, the reference circuit 152 fixes the resistance of the MTJ element 174 in a high resistance $R_H$ state and the resistance of the MTJ element 175 in a low resistance $R_L$ state.

Subsequently, the reference circuit 152 changes the operation of the circuit from the writing path 171 and the writing path 172 to the readout path 173. Here, since the MTJ element 174 and the MTJ element 175 are in serial connection, the combined resistance of the circuit is $R_L+R_H$. Thus, the circuit 170 supplies the current I/2 to the readout path 173, I representing the output current of the read circuit 130, in the operation of the readout path 173, thereby outputting the output voltage of $(V_L+V_R)/2$. By such a structure, the operation of the signal output circuit 150 can be stabilized.

Subsequently, with reference to FIG. 13 to FIG. 15, a structure in which the magnetic tunnel junction elements 110 that are in serial connection are further connected in parallel is described. By further connecting the serially connected magnetic tunnel junction elements 110 in parallel, more random numbers can be generated per unit time, and the random numbers are generated with higher efficiency.

Figure 14B:
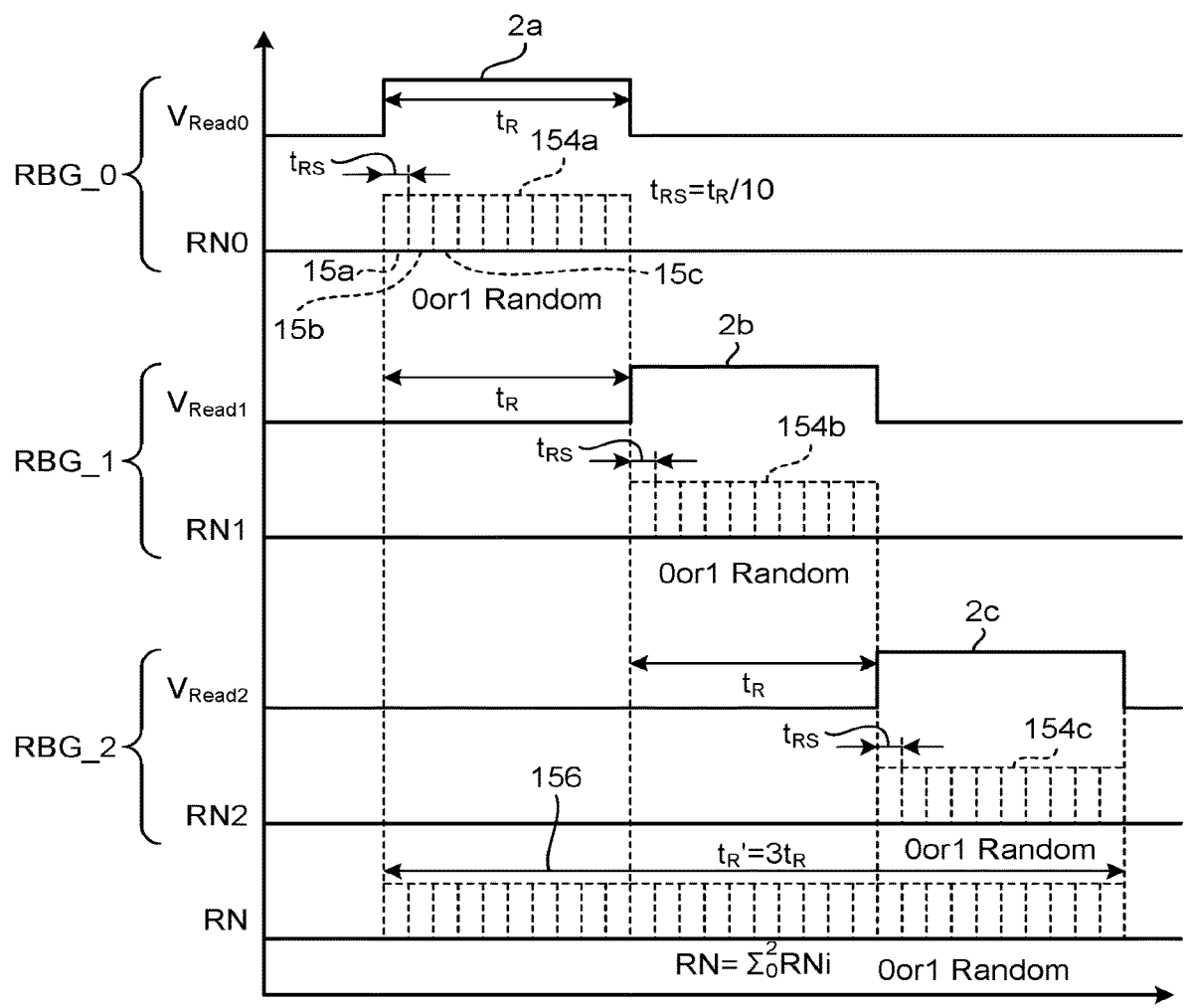
FIG. 14B illustrates one example of the sequence chart of the random number generator according to the embodiment.

FIG. 13, FIG. 14A, and FIG. 14B illustrate such a situation.

FIG. 13 illustrates one example of the circuit structure in which the serially connected magnetic tunnel junction elements 110 are further connected in parallel. That is to say, in the random number generator 100, the MTJ elements 110 that are connected in series are connected in parallel. In the example in FIG. 13, five MTJ elements 110, MTJ01, MTJ02, MTJ03, MTJ04, and MTJ05, are connected in series, and these elements are connected in parallel in three rows of RBG_0, RBG_1, and RBG_2. Here, for each MTJ element, the write circuit 120, the read circuit 130, and the erase circuit 140 perform the aforementioned process, thereby performing writing, readout, and erasing of the signal. Here, the writing process is performed at the same time for one row of the MTJ elements while the readout process is performed sequentially for each MTJ element. For example, the read circuit 130 sequentially performs the readout process for each of the MTJ elements, MTJ01, MTJ02, MTJ03, MTJ04, and MTJ05. In addition, the signal output circuit 150 compares between the voltage value when the readout current is supplied to each MTJ element and the output result of the aforementioned reference circuit 152, performs the differential amplifying process in the differential amplifier 151, generates the random number signals, and thus generates the random number signals for one row. For example, the signal output circuit 150 compares the output voltage when the readout current is supplied to the MTJ element MTJ01 and the output voltage output from the reference circuit 152 corresponding to the MTJ element MTJ01, performs the differential amplifying process by a differential amplifier DA01, and generates one random number signal. Moreover, the signal output circuit 150 compares the output voltage when the readout current is supplied to the MTJ element MTJ02 and the output voltage output from the reference circuit 152 corresponding to the MTJ element MTJ02, performs the differential amplifying process by a differential amplifier DA02, and generates one random number signal. The similar process is performed for the MTJ elements MTJ03, MTJ04, MTJ05, and the like, and the random number signals thereof are collected to generate the random number signals for one row.

In this manner, as illustrated in FIG. 13, regarding the row RBG_0, the signal output circuit 150 generates random number signals 154a for one row (random number sequence RN0) on the basis of the voltage values obtained when the readout current is supplied to the MTJ elements MTJ01, MTJ02, MTJ03, MTJ04, and MTJ05. Moreover, regarding the row RBG_1, the signal output circuit 150 generates random number signals 154b for one row (random number sequence RN1) on the basis of the voltage values obtained when the readout current is supplied to the MTJ elements MTJ11, MTJ12, MTJ13, MTJ14, and MTJ15. Furthermore, regarding the row RBG_2, the signal output circuit 150 generates random number signals 154c for one row (random number sequence RN2) on the basis of the voltage values obtained when the readout current is supplied to the MTJ elements MTJ21, MTJ22, MTJ23, MTJ24, and MTJ25. Subsequently, the signal output circuit 150 combines the random number signals 154a, the random number signals 154b, and the random number signal 154c with an OR gate 155, generates the random numbers successively, and outputs the result to the buffer 190. That is to say, the signal output circuit 150 combines the information obtained from the respective MTJ elements that are connected in parallel, and generates the random numbers. The buffer 190 temporarily stores the signals output from the signal output circuit 150, and when the random number sequence with a proper length is generated, the buffer outputs the generated final random number sequence to the processing circuit 230.

One of the roles of the buffer 190 is to homogenize the time intervals of the bit strings output in a plurality of cycles. The sequence in the embodiment includes the deactivation time; therefore, the generated random number sequence easily becomes inhomogeneous timely. However, since the buffer 190 exists, the generated random number sequence becomes homogeneous timely.

In addition, the output terminal of the signal output circuit 150 is connected to the feedback control circuit 180, and the feedback control with respect to the current input to the MTJ element 110 is also performed.

FIG. 14A illustrates one example of the sequence that is performed when the sequence control circuit 160 performs the process. In a writing period 1a, the write circuit 120 supplies the current, which is generated based on the voltage input to the V-I converter 115 under the control of the sequence control circuit 160, to the row RBG_0, that is, the MTJ elements MTJ01, MTJ02, and the like. After a predetermined deactivation time of 15 ns from the writing period 1a, the read circuit 130 applies the readout voltage to the MTJ elements MTJ01, MTJ02, and the like in a readout period 2a under the control of the sequence control circuit 160. After the readout period 2a ends, the erase circuit 140 resets the magnetization of the MTJ elements MTJ01, MTJ02, and the like in an erasing period 3a. The write circuit 120 performs the writing process again after the end of the predetermined deactivation time from the resetting of the magnetization.

With respect to the row RBG_1 next to these rows, that is, the MTJ elements MTJ11, MTJ12, and the like, the write circuit 120 supplies the current, which is generated based on the voltage input to the V-I converter 115 under the control of the sequence control circuit 160, to the MTJ elements MTJ11, MTJ12 in a writing period 1b that is just after the end of the writing period 1a. Similarly, after a predetermined deactivation time of 15 ns from the writing period 1b, the read circuit 130 applies the readout voltage to the MTJ elements MTJ11, MTJ12, and the like in a readout period 2b under the control of the sequence control circuit 160. After the readout period 2b ends, the erase circuit 140 resets the magnetization of the MTJ elements MTJ11, MTJ12, and the like in an erasing period 3b. The write circuit 120 performs the writing process again after the end of the predetermined deactivation time from the resetting of the magnetization.

Similarly, with respect to the row RBC 2 that is further next, that is, the MTJ elements MTJ21, MTJ22, and the like, the write circuit 120 supplies the current, which is generated based on the voltage input to the V-I converter 115 under the control of the sequence control circuit 160, to the MTJ elements MTJ21, MTJ22 in a writing period 1c that is just after the end of the writing period 1b. Similarly, after the predetermined deactivation time from the writing period 1c, the read circuit 130 applies the readout voltage to the MTJ elements MTJ21, MTJ22, and the like in a readout period 2c under the control of the sequence control circuit 160. After the readout period 2c ends, the erase circuit 140 resets the magnetization of the MTJ elements MTJ21, MTJ22, and the like in an erasing period 3c. The write circuit 120 performs the writing process again after the end of the predetermined deactivation time from the resetting of the magnetization.

Subsequently, the random number sequence that is generated is described with reference to FIG. 14B. The sequence chart in FIG. 14B expresses the timing when the readout voltage is applied to each row and the generated random number sequence.

First, the read circuit 130 applies the readout voltage to the MTJ elements MTJ01, MTJ02, and the like in the readout period 2a with respect to the row RBG_0, and accordingly, the signal output circuit 150 generates the random number signals 154a (random number sequence RN0). Specifically, the read circuit 130 applies the readout voltage to the MTJ element MTJ01 in the readout period 2a, and accordingly, the signal output circuit 150 generates a random number signal 15a. The read circuit 130 applies the readout voltage to the MTJ element MTJ02 in the readout period 2a, and accordingly, the signal output circuit 150 generates a random number signal 15b. The read circuit 130 applies the readout voltage to the MTJ element MTJ03 in the readout period 2a, and accordingly, the signal output circuit 150 generates a random number signal 15c. Through these processes, the signal output circuit 150 generates the random number signals 154a (random number sequence RN0).

Similarly, with respect to the row RBG_1, the read circuit 130 applies the readout voltage to the MTJ elements MTJ11, MTJ12, and the like in the readout period 2b, and accordingly, the signal output circuit 150 generates the random number signals 154b (random number sequence RN1). In addition, with respect to the row RBG_2, the read circuit 130 applies the readout voltage to the MTJ elements MTJ21, MTJ22, and the like in the readout period 2c, and accordingly, the signal output circuit 150 generates random number signals 154c (random number sequence RN2).

Here, the OR gate 155 performs the OR process among the random number sequence RN0 generated with respect to the row RBG_0, the random number sequence RN1 generated with respect to the row RBG_1, and the random number sequence RN2 generated with respect to the row RBG_2. Thus, as indicated at the bottom of FIG. 14B, the signal output circuit 150 can generate successively the random number sequence for the entire period 156.

Note that the embodiment is not limited to the example described above, and the nine MTJ elements 110 may be connected in parallel as illustrated in FIG. 15. Here, the reason why the nine MTJ elements 110 are connected in parallel as illustrated in FIG. 15 is as follows. Regarding one MTJ element 110, one random bit is generated per 45 ns. Moreover, regarding one MTJ element 110, the readout takes 5 ns. Therefore, if it is assumed that 45 ns/5 ns=9 parallel rows, the data is read out always in any one of the MTJ elements. Accordingly, by adding the digital signal in each of the parallel circuits in the OR circuit, the signal output circuit 150 can generate the random numbers successively without the deactivation time.

FIG. 16 illustrates a structure of the random number generator 100 including the n serially connected MTJ elements, n expressing the maximum number of MTJ elements that can be connected. The maximum number n is determined in the following manner. It is assumed that the maximum writing current, the minimum power supply voltage condition, and the resistance between the writing electrodes of the MTJ alone to make the magnetization reversal probability of MTJ, which is determined by the temperature and process variation, 50% are $I_{GW\_max}$, $V_{DD\_min}$, $R_{w\_mtj}$, respectively, and the source-drain voltages of MOS along the writing current path in the drawing are $V_{sd\_1}$, $V_{sd\_2}$, $V_{sd\_3}$, and $V_{sd\_4}$. Then, the maximum integer n when the voltage drop between the writing electrodes $n_0$–$n_1$ of the n serially connected MTJs satisfies $I_{SW\_max} \times R_{w\_mtj} \times n < V_{DD\_min} - (V_{sd\_1} + V_{sd\_2} + V_{sd\_3} + V_{sd\_4})$ is determined to be the maximum number n. In other words, the n magnetic tunnel junction elements, the numeral n being determined based on the maximum value $I_{SW\_max}$ of the writing current of the MTJ element and the power supply voltage condition $V_{DD\_min}$, are disposed in serial connection in the random number generator 100.

FIG. 17 illustrates the sequence of the random number generator 100 including m rows of the n serially connected MTJ elements, m expressing the maximum number of rows of the MTJ elements that can be connected in parallel. The drawing illustrates operation timings including a writing period $t_W$, a readout period $t_R$, and an erasing period $t_E$ of each of the rows $RBG_0$ to $RBG_{m-1}$ for the random number generation, which is formed of the n serially connected MTJ elements, and a predetermined deactivation time for 15 ns provided just before the readout period $t_R$ and the writing period $t_W$. The drawing also illustrates that, assuming that the readout period for each MTJ element is $t_{RS}$, the n MTJs are read out in the successive readout periods $t_R = t_{RS} \times n$. The operation timings of the rows $RBG_0$ to $RBG_{m-1}$ are displaced for each readout period $t_R$; thus, the random number sequence RN that is continuous from n×m MTJs is generated in a $t_{CYC}$ period that is one cycle. Therefore, the maximum number m of the random number generation rows that are connected in parallel is determined as the maximum integer that does not exceed $t_{CYC}/t_R$.

Subsequently, with reference to FIG. 18 and FIG. 19, the feedback control performed by the random number generator 100 according to the embodiment is described.

Here, the feedback control is the process of controlling the value of the current that the write circuit 120 inputs to the MTJ element 110 on the basis of the signal output circuit 150. That is to say, the feedback control circuit 180 controls the current to be supplied to the magnetic layer of the MTJ element 110. More specifically, the value of the current that the write circuit 120 inputs to the MTJ element 110 is determined by the control of the value of the voltage input to the V-I converter 115. The feedback control circuit 180 includes a binary counter 181, a digital comparator 182, an up-down counter 183, the DAC 184, and a one-hot encoder 185.

The binary counter 181 is a counter that counts the number of random numbers output from the signal output circuit 150. The digital comparator 182 is a comparator that compares the output result output from the binary counter 181 and a threshold. The up-down counter 183 is a counter that expresses the magnitude of the voltage that is input to the V-I converter. The up-down counter is, for example, a 10-bit counter, that is, expresses the value of the voltage that is input to the V-I converter in a 10-bit digital signal. The one-hot encoder 185 is a circuit that outputs a signal value of 1 for one bit only and a signal value of 0 for the other bits. The DAC (digital-to-analog converter) 184 is a circuit that converts the digital input into the analog signal. The V-I converter 115 is a circuit that converts the input voltage into current and outputs the current. In the example to be described below, the V-I converter 115 is a multi-V-I converter that can operate with eight modes of different V-I conversion characteristics. Note that the binary counter 181, the digital comparator 182, the up-down counter 183, the DAC 184, and the V-I converter 115 are realized as predetermined electronic circuits, for example.

First, the reason why the random number generator 100 using the MTJ elements 110 requires the feedback control is described below briefly.

The operation principle of the random number generator 100 using the MTJ elements 110 utilizes that the reversal of the magnetization of the free layer 10 when the current I is injected to the MTJ elements 110 is the stochastic process. Here, the reversal probability P of the magnetization changes sensitively with the current I that is injected to the free layer 10 of the MTJ element 110. That is to say, the range of the current I whose reversal probability P of the magnetization is exactly 50% is small. In addition, the reversal probability P of the magnetization also changes with the environment such as temperature T. Here, if the reversal probability P of the magnetization deviates from 50%, the quality of the random number is influenced; thus, it is important that the reversal probability P of the magnetization is 50% with high accuracy. Therefore, it is important that the state where the reversal probability P of the magnetization is 50% with high accuracy is kept using a negative feedback mechanism.

In view of the aforementioned background, the random number generator according to the embodiment determines whether the reversal probability P of the magnetization is more than or less than 50%, or equal to 50% using the binary counter 181 and the digital comparator 182, and controls the input voltage to the V-I converter 115 accordingly; thus, the feedback mechanism is realized.

Subsequently, the procedure of the process of the feedback control performed by the random number generator 100 according to the embodiment is described with reference to FIG. 19.

First, the signal output circuit 150 generates a 1-bit random number at step S100, and outputs the random number to the binary counter 181 at step S110. The binary counter 181 receives the count of the number of random numbers output from the signal output circuit 150 until the number of random numbers output from the signal output circuit 150 becomes a predetermined count value, for example. Here, the predetermined count value is, for example, 1024, 2048, 4096, or 8192.

Note that if this count value is too large, the feedback takes longer and if the count value is too small, the feedback becomes unsuitable. That is to say, in the case where an N number of random numbers are generated, even if 0 and 1 are generated at equal probability of 50%, the number of 0 and the number of 1 that are generated vary as much as the square root of N due to the statistical error. If this result is misinterpreted that the probability of generating 0 and 1 is deviated from 50% and accordingly, the probability of generating 0 and 1 is changed, the control becomes unstable. Therefore, the predetermined count value is desirably large to some extent, for example 8192. On the other hand, if the predetermined count value is too large, the time until the feedback works takes long; therefore, the count value is selected in consideration of the effect thereof.

The binary counter 181 counts the number of data with a value "1" and the number of data with a value "0" among the received counts.

If the binary counter 181 does not attain the predetermined count value (No at step S120), the binary counter 181 keeps receiving the input of the data. On the other hand, if the binary counter 181 attains the predetermined count value (Yes at step S120), the binary counter 181 outputs the accumulated count values, that is the number of data with a value of "1" or the number of data with a value "0", to the digital comparator 182 at step S130.

Subsequently, at step S140, the digital comparator 182 compares the count number acquired from the binary counter 181 at step S130 with a threshold. That is to say, the feedback control circuit 180 compares the count value, which is a discrete value obtained by the binary signal generated based on the magnetization, with a threshold. Here, for example, the threshold is a value obtained by multiplying 0.5 by the predetermined count value at step S120. For example, if the predetermined count value at step S120 is "4096", the threshold which the digital comparator 182 compares with the count value is "2048". That is to say, in this case, the subsequent feedback control is performed depending on whether the count number of data with "1" among the predetermined count number 4096 data is larger than, smaller than, or equal to that of 2048.

Here, if the count value is smaller than the threshold, the process advances to step S150A, the value in the up-down counter is increased by one and the voltage control of the V-I converter 115 is performed in a direction where the count value increases. On the other hand, if the count value is larger than the threshold, the process advances to step S150B, the value in the up-down counter is decreased by one and the voltage control of the V-I converter 115 is performed in a direction where the count value decreases. That is to say, if the discrete value obtained by the binary signal generated based on the magnetization is less than the threshold, the feedback control circuit 180 controls the current supplied by the write circuit 120 so that the discrete value increases, and if the discrete value obtained by the binary signal generated based on the magnetization is more than the threshold, the feedback control circuit 180 controls the current supplied by the write circuit 120 so that the discrete value decreases.

Note that the up-down counter 183 outputs the digital signal for controlling the input voltage to the V-I converter 115, and as the value of the up-down counter 183 increases, the count value at step S130 increases. On the contrary, as the value of the up-down counter 183 decreases, the count value at step S130 decreases.

In the embodiment described below, the V-I converter 115 is a multi-V-I converter that can switch V-I characteristics in eight modes, and the up-down counter 183 outputs the 10-bit digital signal. Here, the 10 bits of the up-down counter 183 include the 3-bit digital data expressing the mode of the V-I characteristic of the V-I converter 115 that is the multi-V-I converter, and the 7-bit digital data expressing the magnitude of the voltage input to the V-I converter 115 in this mode.

Here, for example, if the higher three bits are "000", the V-I converter 115 operates in a first mode, if the higher three bits are "001", the V-I converter 115 operates in a second mode, and if the higher three bits are "010", the V-I converter 115 operates in a third mode. Here, when the V-I converter 115 operates in an N-th mode, it means that the V-I converter 115 operates with the N-th V-I characteristic. For example, the voltage input to the V-I converter 115 when the value of the up-down counter 183 is "0010000000" is close to the voltage input to the V-I converter 115 when the value of the up-down counter 183 is "0001111111". Moreover, the voltage input to the V-I converter 115 when the value of the up-down counter 183 is "0100000000" is close to the voltage input to the V-I converter 115 when the value of the up-down counter 183 is "0011111111". In this manner, when the value of the up-down counter 183 changes successively from "0000000000" to "1111111111", the current input to the MTJ element 110 changes successively while the operation mode of the V-I converter 115 changes as necessary.

In the case where the V-I converter 115 is the multi-V-I converter that operates with the N modes of the V-I characteristics, if the error of the output current of the V-I converter is constant as compared with the single-V-I converter, the error of the count value at step S130 and the input voltage to the V-I converter is allowed up to about N times, and thus, the input current to the MTJ elements 110 can be controlled with high accuracy.

In view of this, at step S160, the up-down counter 183 sends the lower 7-bit value of the counter value of the up-down counter to the DAC 184 on the basis of the lower 7-bit value of the counter value of the up-down counter that is updated, and the DAC 184 sets the value of the input voltage $V_{in}$ to the V-I converter 115 on the basis of the lower 7-bit value of the counter value of the up-down counter that is acquired. In addition, at step S170, the up-down counter 183 gives the higher 3-bit value of the counter value of the up-down counter that is updated to the one-hot encoder 185, and the one-hot encoder 185 controls the operation mode of the V-I converter 115 on the basis of the given information. Through such a process, the feedback control circuit 180 according to the embodiment reduces the ratio of generating "1" if the ratio of "1" is more than 50%, and on the contrary, if the ratio of "1" is less than 50%, the feedback control circuit 180 can control to increase the ratio of generating "1". Thus, the ratio of generating "0" and "1" can be maintained at approximately 50%.

Subsequently, a process in the case where the count value at step S130 and the threshold are equal at step S140 is described. In the case where the count value at step S130 is equal at step S140, the digital comparator 182 maintains the value of the input voltage input to the V-I converter 115 and the value of current that the write circuit 120 inputs to the MTJ element 110. In other words, if the discrete value obtained by the binary signal generated based on the magnetization is equal, the feedback control circuit 180 maintains the current that the write circuit 120 supplies. That is to say, the digital comparator 182 compares the count value output from the binary counter and the threshold, and performs three kinds of control depending on whether the count value is smaller than, larger than, or equal to the threshold.

In the case of the third control, that is, the case where the count value is equal to the threshold, the process of maintaining the value of the input voltage that is input to the V-I converter 115 and the value of current that the write circuit 120 inputs to the MTJ element is performed and this is for the purpose of stabilizing the feedback control. Even in the case of two kinds of control without the control in the case where the count number and the threshold are equal, theoretically, the feedback control can be performed. In fact, however, for example, even if the signals "1" and "0" are generated with the perfectly equal probability, the number of "1" signals and the number of "0" signals vary due to the statistic variation. Therefore, it is considered that processing with excessive optimization against this variation may result in degrading the stability of the feedback control.

Note that the term "equal" in this specification means not just perfectly equal but also equal in a certain error range, for example, the count difference within 2, and three kinds of control may be performed. For example, at step S140, in the case where the count number is 3 or smaller than the threshold, a process at step S150A is performed, in the case where the count number is 3 or larger than the threshold, a process at step S150B is performed, and in a case where the difference between the count number and the threshold is 2 or less, the current state is maintained. Thus, by daring to perform the control with the process of not performing the control from the current state, the feedback control can be performed with higher stability.

The embodiment is not limited to the aforementioned example. In the embodiment described above, the V-I converter 115 is the multi-V-I converter that operates with the multiple modes of the V-I characteristics; however, the embodiment is not limited to this example. The V-I converter 115 may be a single-V-I converter that operates with one mode of the V-I characteristic. The operation mode of the V-I converter 115 is not limited to the eight modes, and the structure of the up-down counter 183 may be changed as appropriate in accordance with the number of operation modes of the V-I converter 115.

As described above, the reversal probability P of the magnetization of the MTJ element 110 also changes depending on the environment such as temperature T. In order to maintain the reversal probability P at 50% from the initial operation stage of the device, a temperature sensor that detects the temperature T of the MTJ element 110 may be provided additionally and based on the temperature detected by this temperature sensor, the initial operation mode of the V-I converter 115 may be decided. In other words, the random number generator 100 according to the embodiment includes the V-I converter 115 that converts the voltage into current in a predetermined operation mode upon the reception of the input of the voltage, and outputs the current, and the sequence control circuit 160 that controls so that the current flows by the input of the voltage to the V-I converter 115. The feedback control circuit 180 includes a conversion unit (not shown) that can switch the operation modes. The feedback control circuit 180 includes a temperature sensor (not shown) that detects the temperature in the range including at least the MTJ element 110, and on the basis of the temperature detected by the temperature sensor, switches the operation mode of the V-I converter 115 by the function of the conversion unit.

Specifically, a table in which the temperature T detected by the temperature sensor and the initial operation mode of the V-I converter 115 are associated with each other is stored separately and on the basis of the temperature T detected by the temperature sensor, the feedback control circuit 180 determines the initial value of the higher three bits of the up-down counter 183. Subsequently, the feedback control circuit 180 switches the operation mode of the V-I converter 115 on the basis of the determined initial value of the higher three bits of the up-down counter 183 by the function of the conversion unit. Since the operation mode of the V-I converter 115 is determined by the higher three bits of the up-down counter 183, the operation mode of the V-I converter 115 that is optimal to the environment temperature can be determined, and thus, the initial operation becomes more stable. Note that after the random number generator starts to operate, the operation mode of the V-I converter 115 changes dynamically not by the temperature detection of the temperature sensor but by the aforementioned feedback control.

By at least one of the random number generators described above, the random number with high quality can be generated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A random number generator comprising:
a write circuit configured to invert magnetization of a magnetic layer of a magnetic tunnel junction element stochastically by supplying current to the magnetic layer;
a read circuit configured to read the magnetization;
a signal output circuit configured to generate a random number on the basis of the magnetization read by the read circuit;
a sequence control circuit configured to control the write circuit and the read circuit, wherein
the sequence control circuit is configured to regulate the write circuit to supply the current to the write circuit in a first period, and
the sequence control circuit is configured to cause the read circuit to read the magnetization after the first period is finished and then after a second period following the first period and longer than the first period is elapsed; and
a feedback control circuit configured to control the current, wherein
the feedback control circuit is configured to compare a discrete value resulting from a binary signal generated based on the magnetization, with a threshold, and
in a case where the discrete value is lower than the threshold, the feedback control circuit is configured to control the current supplied by the write circuit so that the discrete value increases, in a case where the discrete value is higher than the threshold, the feedback control circuit is configured to control the current supplied by the write circuit so that the discrete value decreases, and in a case where the discrete value is equal to the threshold or within an error range of the threshold, the feedback control circuit is configured to maintain the current supplied by the write circuit.

2. The random number generator according to claim 1, wherein the second period is a period until charges accumulated in the magnetic layer disappear.

3. The random number generator according to claim 1, wherein the second period is a period three times or longer than the first period.

4. The random number generator according to claim 1, wherein the second period is 15 ns or more.

5. The random number generator according to claim 1, wherein
a plurality of the magnetic tunnel junction elements are connected in series and disposed in the random number generator,
the write circuit is configured to supply the current to the magnetic tunnel junction elements so that the magnetization of the magnetic layer of each magnetic tunnel junction element is inverted independently stochastically, and
the read circuit is configured to read the magnetization of each magnetic tunnel junction element.

6. The random number generator according to claim 5, wherein
the serially connected magnetic tunnel junction elements are connected in parallel in the random number generator, and
the signal output circuit is configured to combine information obtained from each of the magnetic tunnel junction elements that are connected in parallel, and generate the random number.

7. The random number generator according to claim 5, wherein the magnetic tunnel junction elements are disposed in serial connection in the random number generator, the number of magnetic tunnel junction elements being determined based on a maximum value of writing current of the magnetic tunnel junction element and a power supply voltage condition.

8. The random number generator according to claim 1, further comprising a buffer configured to temporarily store a signal output from the signal output circuit.

9. The random number generator according to claim 1, the signal output circuit comprising:
a reference circuit configured to acquire an electric characteristic of the magnetic tunnel junction element, and
a differential amplifier configured to generate a differential amplification signal, based on which the random number is generated, by performing differential amplification between a signal output from the magnetic tunnel junction element and a signal output from the reference circuit.

10. The random number generator according to claim 9, wherein the reference circuit includes two serially connected magnetic tunnel junction elements.

11. The random number generator according to claim 1, further comprising a V-I converter configured to, upon reception of input of voltage, convert the voltage into current in a predetermined operation mode, and output the current, wherein
the sequence control circuit is configured to control so that the current is supplied by the input of the voltage to the V-I converter,
the feedback control circuit is able to switch a plurality of the operation modes, and
the feedback control circuit includes a temperature sensor that detects temperature of an area including at least the magnetic tunnel junction element, and on the basis of the temperature detected by the temperature sensor, switches the operation mode of the V-I converter.

12. The random number generator according to claim 1, further comprising a V-I converter configured to, upon reception of input of voltage, convert the voltage into current in a predetermined operation mode, and output the current, wherein
the sequence control circuit is configured to control so that the current is supplied by the input of the voltage to the V-I converter,
the feedback control circuit is able to switch a plurality of the operation modes, and
the feedback control circuit switches the operation mode of the V-I converter on the basis of temperature detected by a temperature sensor that detects temperature of an area including at least the magnetic tunnel junction element.

* * * * *